United States Patent
Olekas et al.

(10) Patent No.: US 9,933,517 B1
(45) Date of Patent: Apr. 3, 2018

(54) TIME-ALIGNMENT OF MOTION DETECTION SIGNALS USING BUFFERS

(71) Applicant: Cognitive Systems Corp., Waterloo (CA)

(72) Inventors: Christopher Vytautas Olekas, Breslau (CA); Dustin Griesdorf, Waterloo (CA)

(73) Assignee: Cognitive Systems Corp., Waterloo, Ontario (CA)

( * ) Notice: Subject to any disclaimer, the term of this patent is extended or adjusted under 35 U.S.C. 154(b) by 0 days.

(21) Appl. No.: 15/803,189

(22) Filed: Nov. 3, 2017

(51) Int. Cl.
*G08B 13/24* (2006.01)
*G01S 13/538* (2006.01)
*G01S 13/56* (2006.01)
*G01S 13/87* (2006.01)
(Continued)

(52) U.S. Cl.
CPC ............ *G01S 13/538* (2013.01); *G01S 13/56* (2013.01); *G01S 13/87* (2013.01); *G01S 7/415* (2013.01); *G01S 13/886* (2013.01); *G08B 13/2494* (2013.01)

(58) Field of Classification Search
CPC ........ G01S 13/04; G01S 13/878; G01S 11/02; G01S 7/415; G08B 13/3491; G08B 13/2494; G08B 21/22; H04W 24/08
See application file for complete search history.

(56) References Cited

U.S. PATENT DOCUMENTS

| | | |
|---|---|---|
| 4,054,879 A | 10/1977 | Wright et al. |
| 4,649,388 A | 3/1987 | Atlas |
| 4,740,045 A | 4/1988 | Goodson et al. |

(Continued)

FOREIGN PATENT DOCUMENTS

| | | |
|---|---|---|
| CA | 2834522 | 5/2014 |
| CA | 2945702 | 8/2015 |

(Continued)

OTHER PUBLICATIONS

Yue Zheng, Chenshu Wu, Kun Qian, Zheng Yang, Yunhao Liu, "Detecting radio frequency interference for CSI measurements on COTS WiFi devices", Tsinghua University, IEEE ICC 2017 Ad-Hoc and Sensor Networking Symposium, May 2017, IEEE.*

(Continued)

*Primary Examiner* — Aristocratis Fotakis
(74) *Attorney, Agent, or Firm* — Henry Patent Law Firm PLLC

(57) ABSTRACT

In a general aspect, a filter time aligns time varying RF-motion data. In some aspects, a method includes loading a first set of input signals (SISs) into an interference buffer over a first time period. The first SISs is based on a first set of wireless signals received by a wireless communication device (WCD) after being transmitted through a space. The method includes using the first SISs to determine an interference level. The method includes: in response to determining the interference level is below a threshold, executing a motion detection process in a second, subsequent time period over which a second SISs is loaded into the interference buffer. The motion detection process, using a subset of the first SISs, detects motion of an object in the space. The second SISs are based on a second set of wireless signals received by the WCD after being transmitted through the space.

21 Claims, 13 Drawing Sheets

(51) Int. Cl.
*G01S 13/88* (2006.01)
*G01S 7/41* (2006.01)

(56) References Cited

U.S. PATENT DOCUMENTS

| | | | |
|---|---|---|---|
| 5,270,720 | A | 12/1993 | Stove |
| 5,696,514 | A | 12/1997 | Nathanson et al. |
| 6,075,797 | A | 6/2000 | Thomas |
| 6,493,380 | B1 | 12/2002 | Wu et al. |
| 6,573,861 | B1 | 6/2003 | Hommel et al. |
| 7,047,015 | B2 | 5/2006 | Hawe |
| 7,295,109 | B2 | 11/2007 | Kobayashi |
| 7,317,419 | B2 | 1/2008 | Sugar et al. |
| 7,652,617 | B2 | 1/2010 | Kurtz et al. |
| 8,138,918 | B2 | 3/2012 | Habib |
| 8,331,498 | B2 | 12/2012 | Huang et al. |
| 8,477,750 | B2 | 7/2013 | Agarwal et al. |
| 8,710,984 | B2 | 4/2014 | Wilson et al. |
| 8,818,288 | B2 | 8/2014 | Patwari et al. |
| 8,836,344 | B2 | 9/2014 | Habib et al. |
| 9,143,413 | B1 | 9/2015 | Manku et al. |
| 9,143,968 | B1 | 9/2015 | Manku et al. |
| 9,523,760 | B1 | 12/2016 | Kravets et al. |
| 9,524,628 | B1 | 12/2016 | Omer et al. |
| 9,584,974 | B1 | 2/2017 | Omer et al. |
| 9,743,294 | B1 | 8/2017 | Omer et al. |
| 2003/0108119 | A1 | 6/2003 | Mohebbi et al. |
| 2005/0055568 | A1 | 3/2005 | Agrawala et al. |
| 2005/0083199 | A1 | 4/2005 | Hall et al. |
| 2006/0217132 | A1 | 9/2006 | Drummond-Murray et al. |
| 2008/0119130 | A1 | 5/2008 | Sinha |
| 2008/0240008 | A1 | 10/2008 | Backes et al. |
| 2008/0303655 | A1 | 12/2008 | Johnson |
| 2009/0040952 | A1 | 2/2009 | Cover et al. |
| 2009/0062696 | A1 | 3/2009 | Nathan et al. |
| 2010/0026490 | A1* | 2/2010 | Butler ............... G08B 13/2494 340/552 |
| 2010/0315284 | A1 | 12/2010 | Trinza et al. |
| 2011/0130092 | A1 | 6/2011 | Yun et al. |
| 2012/0009882 | A1 | 1/2012 | Patwari et al. |
| 2012/0115512 | A1 | 5/2012 | Grainger et al. |
| 2012/0146788 | A1 | 6/2012 | Wilson et al. |
| 2012/0184296 | A1 | 7/2012 | Milosiu |
| 2013/0005280 | A1* | 1/2013 | Leung .................... G01S 7/023 455/90.1 |
| 2013/0090151 | A1 | 4/2013 | Ngai et al. |
| 2013/0162459 | A1* | 6/2013 | Aharony ............... G01S 13/003 342/27 |
| 2013/0283256 | A1 | 10/2013 | Proud |
| 2014/0004874 | A1 | 1/2014 | Schwartz et al. |
| 2014/0015706 | A1* | 1/2014 | Ishihara ................ G08B 21/22 342/27 |
| 2014/0128778 | A1 | 5/2014 | Chan et al. |
| 2014/0135042 | A1 | 5/2014 | Buchheim et al. |
| 2014/0140231 | A1 | 5/2014 | Haiut et al. |
| 2014/0247179 | A1 | 9/2014 | Furuskog |
| 2014/0286380 | A1 | 9/2014 | Prager et al. |
| 2015/0043377 | A1 | 2/2015 | Cholas et al. |
| 2015/0078295 | A1 | 3/2015 | Mandyam et al. |
| 2015/0098377 | A1 | 4/2015 | Amini et al. |
| 2015/0195100 | A1 | 7/2015 | Imes et al. |
| 2015/0212205 | A1 | 7/2015 | Shpater |
| 2015/0245164 | A1 | 8/2015 | Merrill |
| 2015/0338507 | A1 | 11/2015 | Oh et al. |
| 2016/0018508 | A1 | 1/2016 | Chen et al. |
| 2016/0183059 | A1 | 6/2016 | Nagy et al. |
| 2016/0187475 | A1 | 6/2016 | Horng et al. |
| 2016/0210838 | A1 | 7/2016 | Yan et al. |
| 2016/0241999 | A1 | 8/2016 | Chin et al. |
| 2017/0146656 | A1 | 5/2017 | Belsley et al. |
| 2017/0309146 | A1* | 10/2017 | MacKenzie ........... G01S 13/003 |
| 2017/0343658 | A1 | 11/2017 | Ramirez et al. |

FOREIGN PATENT DOCUMENTS

| | | |
|---|---|---|
| WO | 2014/021574 | 2/2014 |
| WO | 2014/201574 | 12/2014 |
| WO | 2015/168700 | 11/2015 |

OTHER PUBLICATIONS

Bo Wei, Wen Hu, Mingrui Yang, Chun Tung Chou, "Radio-based Device-free Activity Recognition with Radio Frequency Interference", University of New South Wales, Australia, IPSN '15 Proceedings of the 14th International Conference on Information Processing in Sensor Networks, Apr. 13-16, 2015.*
USPTO, Non-Final Office Action issued in U.S. Appl. No. 15/691,195 dated Nov. 15, 2017; 17 pgs.
Canadian Intellectual Property Office, International Search Report and Written Opinion for International Application No. PCT/CA2017/050037 dated Apr. 13, 2017, 12 pages.
USPTO, Notice of Allowance issued in U.S. Appl. No. 15/461,125 dated Aug. 30, 2017, 15 pages.
Canadian Intellectual Property Office, International Search Report and Written Opinion issued International Application No. PCT/CA2016/051228 dated Apr. 25, 2017, 8 pages.
Canadian Intellectual Property Office, International Search Report and Written Opinion issued in International Application No. PCT/CA2016/051466 dated Mar. 14, 2017, 9 pages.
Apple Insider; "Intel to reportedly supply LTD chips for 2016 iPhone"; http://appleinsider.com/articles/15/03/11/intel-to-reportedly-supply-ltd-chips-for-2016-iphone; 2 pages; May 15, 2016.
CEVA; "CEVA's DSP Cores Power the World's Leading Mobile Broadband and M2M Applications"; http://www.ceva-dsp.com/Mobile-Broadband; 3 pages; May 15, 2016.
Japan Radio Co., Ltd; "26GHz FWA—Technology"; http://www.jrc.co.jp/eng/product/lneup/26ghz_wireless_ip_access_system/tech.html; 3 pages; May 15, 2016.
Non-Final Office Action received in U.S. Appl. No. 15/099,833, dated Jun. 27, 2016, 16 pages.
Non-Final Office Action received in U.S. Appl. No. 15/151,571, dated Aug. 5, 2016, 18 pages.
Notice of Allowance received in U.S. Appl. No. 15/099,833, dated Oct. 14, 2016, 8 pages.
Notice of Allowance received in U.S. Appl. No. 15/151,571, dated Jan. 10, 2017, 9 pages.
Notice of Allowance received in U.S. Appl. No. 15/228,418, dated Oct. 12, 2016, 9 pages.
quora.com; "What is the function of the baseband processor in wireless devices?"; https://ww.quora.com/What-is-the-function-of-the-baesband-processor-in-wireless-devices; 2 pages; May 15, 2016.
Wikipedia; "Baseband processor"; rhttps://en.wikipedia.org/wiki/Bandband_processor; 2 pages; version dated Apr. 20, 2016.
Canadian Intellectual Property Office, International Search Report and Written Opinion, in International Application No. PCT/CA2016/051229, dated Jan. 17, 2017, 9 pages.
Netgear , "N600 Will Cable Modem Router, Model C3700 User Manual", https://web.archive.org/web/20150121182848/http://www.downloads.netgear.com/files/GDC/C3700_UM_21Aug2014.pdf (archive of URL http://www.downloads.netgear.com/files/GDC/C3700_UM_21Aug2014.pdf captured on Jan. 21, 2015, 101 pages.
Openwrt , "Wireless Configuration", https://web.archive.org/web/20140402033233/http://wiki.openwrt.org/doc/uci/wireless (capture of URL http://wiki.openwrt.org/doc/uci/wireless on Apr. 2, 2014), 22 pages.
USPTO , Final Office Action received in U.S. Appl. No. 15/176,489 dated Jun. 23, 2017, 23 pages.
USPTO , Notice of Allowance issued in U.S. Appl. No. 15/460,643 dated Jun. 12, 2017, 34 pages.
USPTO , Non-final Office Action issued in U.S. Appl. No. 15/461,125 dated Apr. 19, 2017, 56 pages.
USPTO , "Non-final Office Action", issued in U.S. Appl. No. 15/176,489 dated Mar. 22, 2017, 41 pages.

(56) References Cited

OTHER PUBLICATIONS

USPTO, Non-Final Office Action dated Dec. 28, 2017, in U.S. Appl. No. 15/789,761, 31 pgs.
USPTO, Non-Final Office Action received in U.S. Appl. No. 15/799,768 dated Dec. 13, 2017, 7 pgs.
Youssef, Moustafa, et al., "Challenges: Device-free Passive Localization for Wireless Environments", Mobicom 07 Proceedings of the 13th Annual ACM International Conference on Mobile Computing and Networking, Sep. 2007, 31 pgs.

* cited by examiner

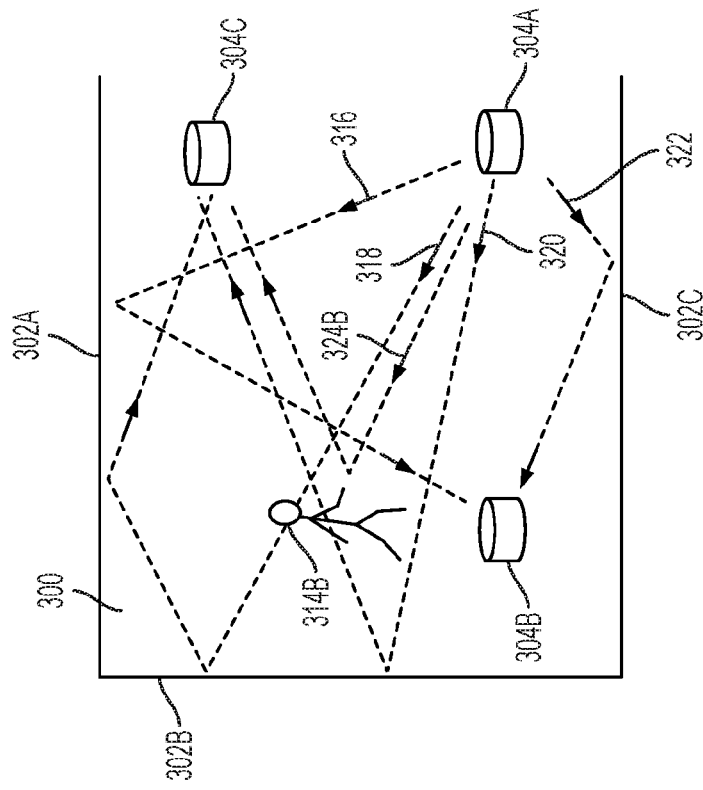
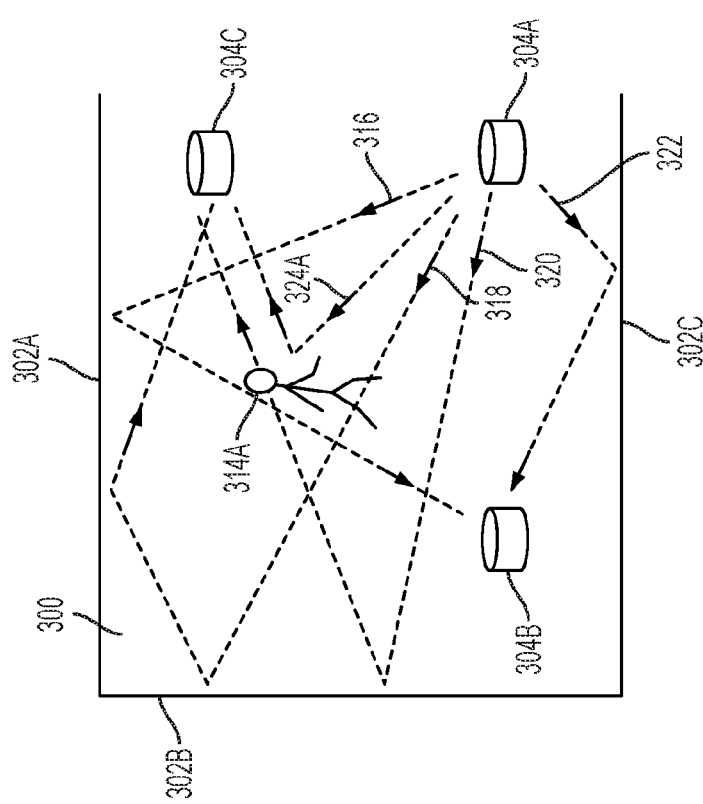

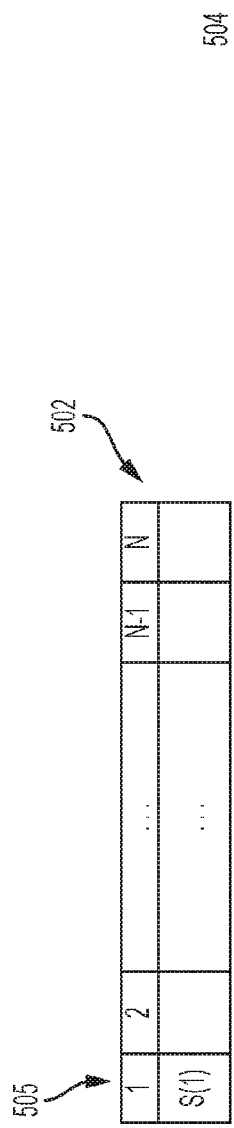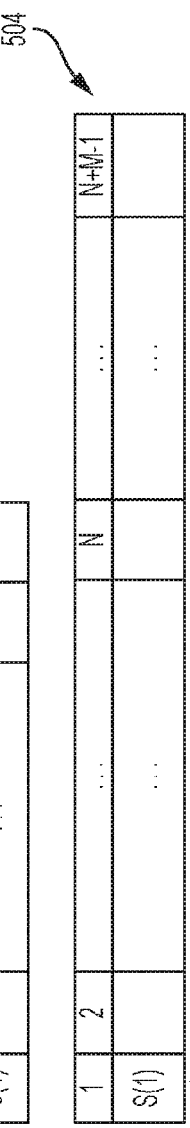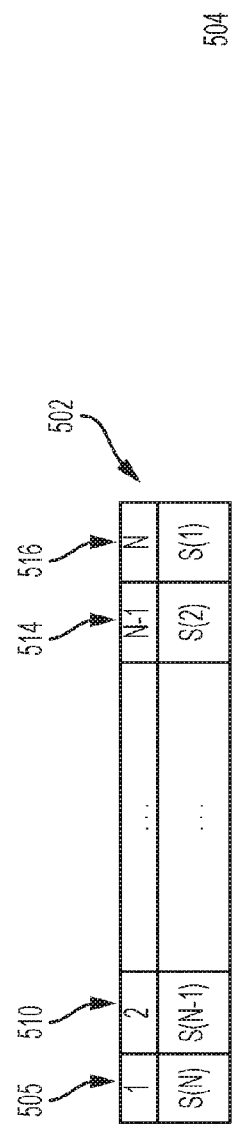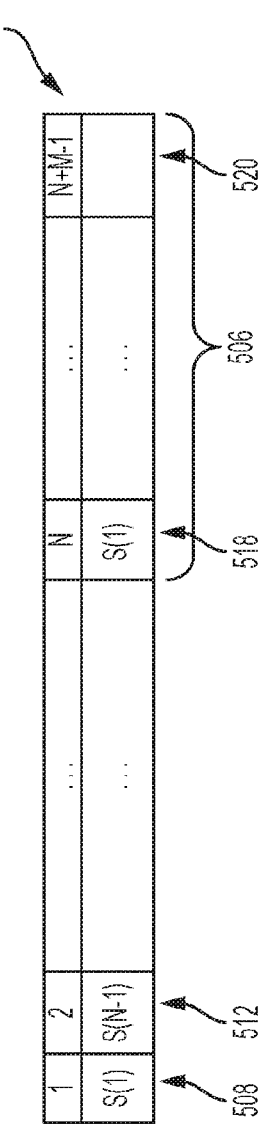
FIG. 5A
FIG. 5B

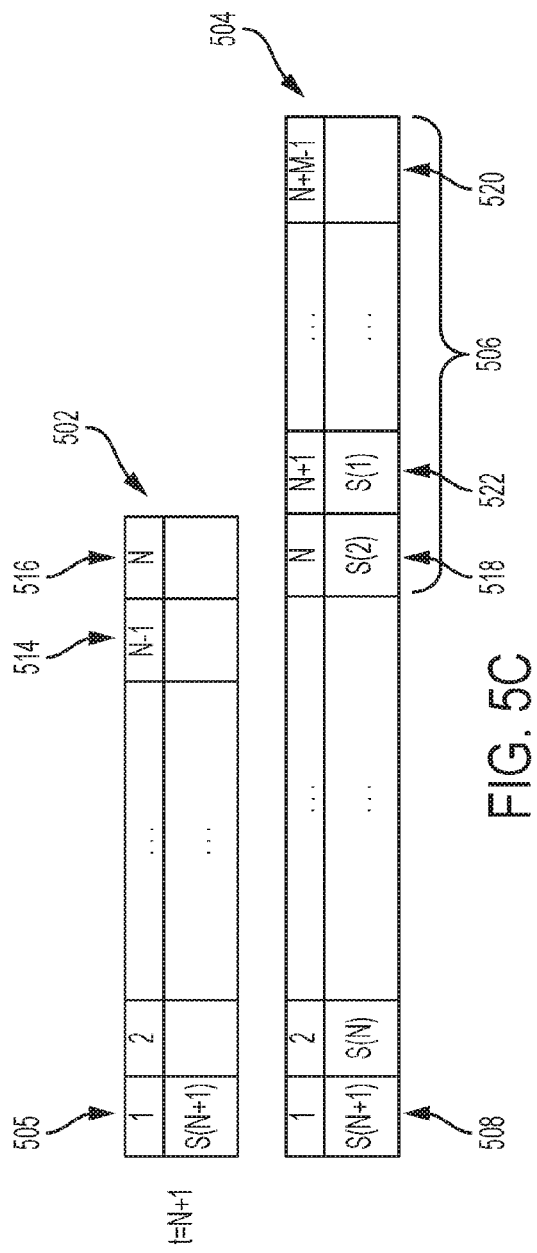
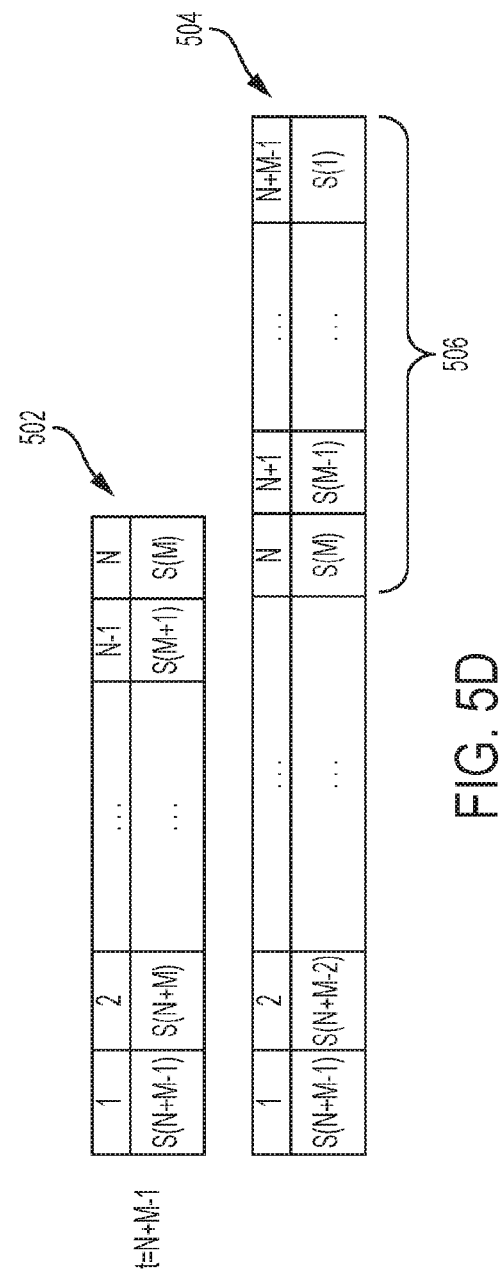
FIG. 5C
FIG. 5D

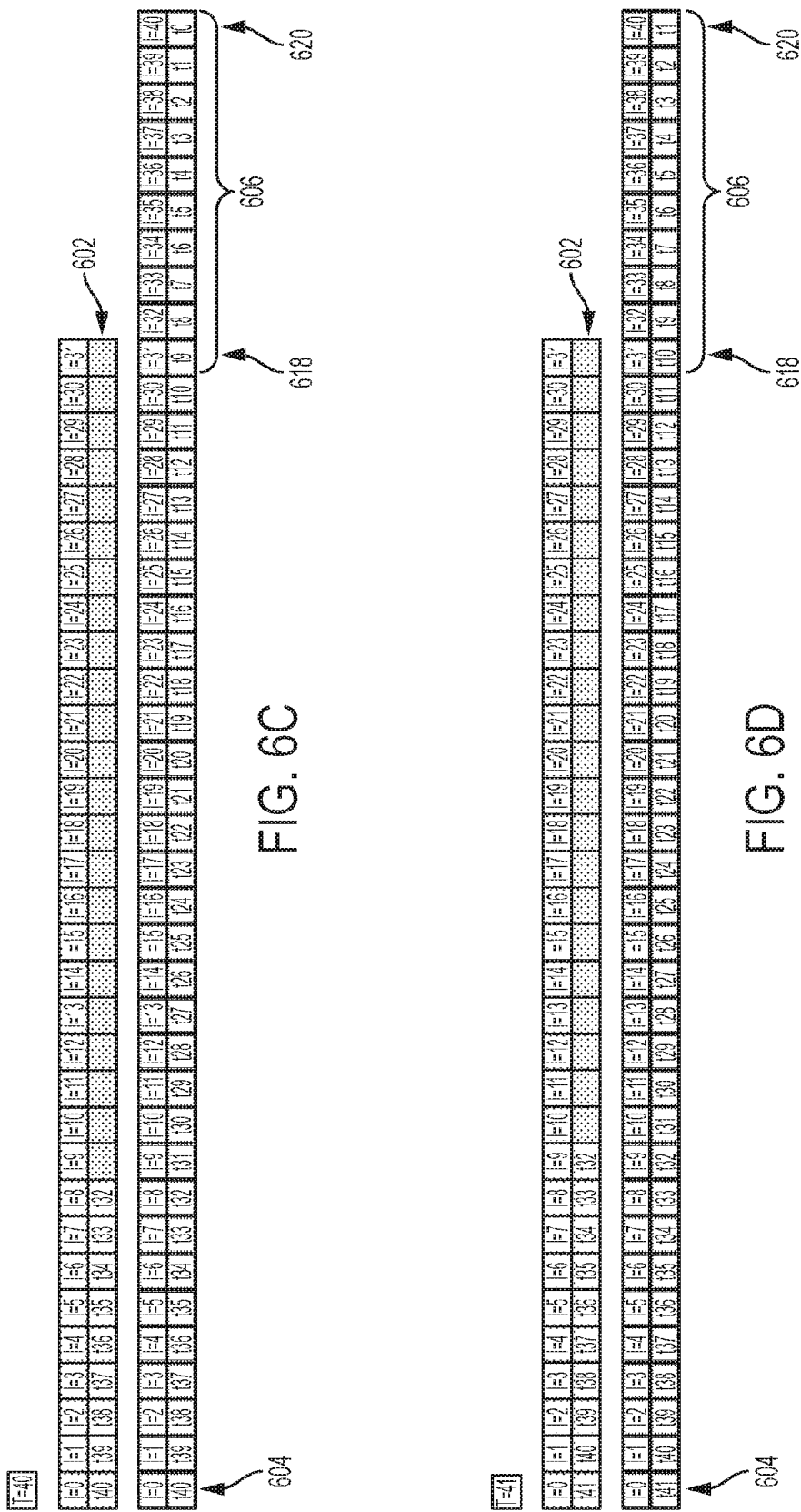

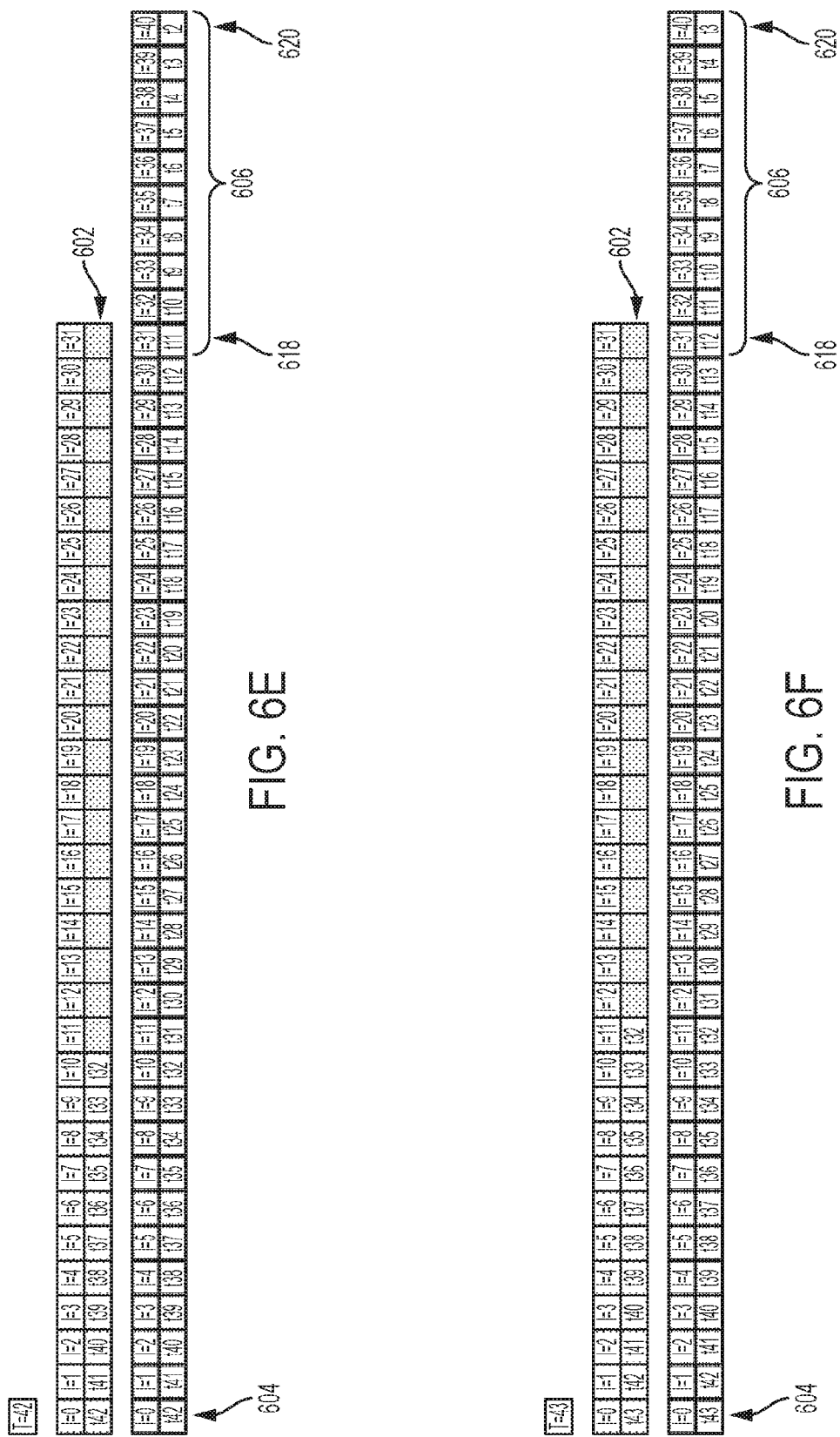

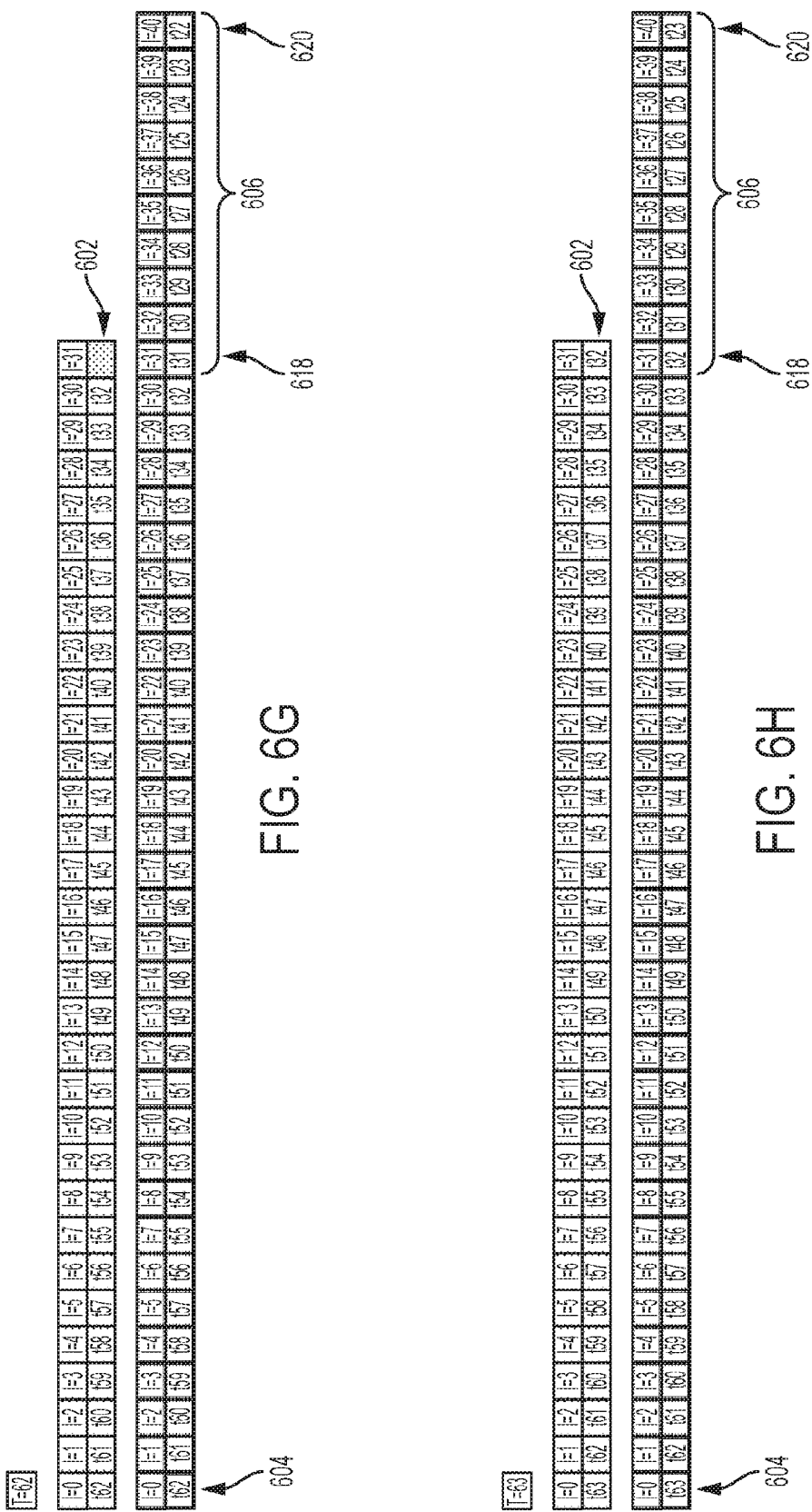

TIME-ALIGNMENT OF MOTION DETECTION SIGNALS USING BUFFERS

BACKGROUND

The following description relates to motion detection.

Motion detection systems have been used to detect movement, for example, of objects in a room or an outdoor area. In some example motion detection systems, infrared or optical sensors are used to detect movement of objects in the sensor's field of view. Motion detection systems have been used in security systems, automated control systems and other types of systems.

DESCRIPTION OF DRAWINGS

FIGS. 3A and 3B are diagrams showing example wireless signals communicated between wireless communication devices.

FIGS. 5A through 5E (together referred to as FIG. 5) are diagrams showing an example process of loading an interference buffer and a motion detection buffer.

FIGS. 6A through 6H (together referred to as FIG. 6) are diagrams showing another example process of loading an interference buffer and a motion detection buffer.

DETAILED DESCRIPTION

In some aspects of what is described, motion detection signals are time-aligned using buffers. For example, in some implementations, interference and motion detection buffers of different lengths are used to time-align motion detection signals for a motion detection process. An interference filter makes a determination regarding a level of wireless interference present in the input signals in the interference buffer, and based on the determination, the motion detection process either executes or does not execute on input signals in the motion detection buffer.

For instance, in some aspects, the interference filter determines whether an unacceptable interference level is present in a set of N input signals, and in response to the determination, the motion detection process may execute or not execute on the set of N input signals. The interference buffer may then obtain a second set of N input signals while the motion detection process is executed on the first set of N input signals. In some cases, the motion detection process may execute on M<N input signals at a time. Thus, the interference buffer may have space for N input signals and the motion detection buffer may have space for N+M−1 input signals.

The systems and techniques described here may provide one or more advantages in some instances. For example, motion may be detected using wireless signals transmitted through a space. The embodiments of this disclosure provide a complex filter (namely, the time alignment input signals) that can be applied to a large data set to determine whether the data on which a motion detection process is executed is "clouded" with interference signals or not. By time-aligning the data paths of the interference filter and the motion detection process, the complex filter has an opportunity to evaluate on more data and extract (or discard) features from the data set to ensure that motion detected in a space is genuinely motion of an object and not a false-positive caused by wireless interference present in the space. In addition, the motion detection process can be executed in a pseudo real-time manner, with minimal delay.

Figure 1:
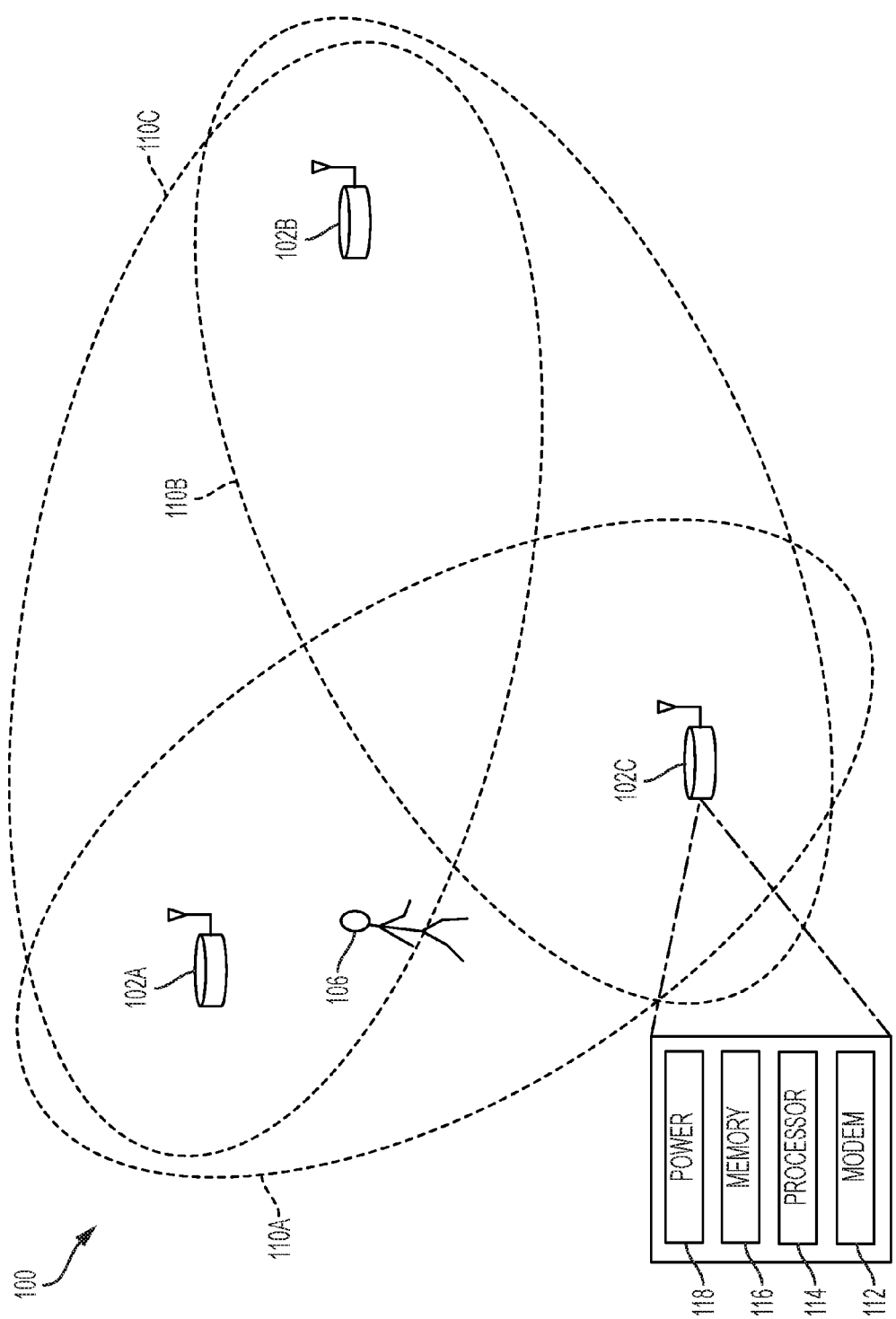
FIG. 1 is a diagram showing an example wireless communication system.

FIG. 1 illustrates an example wireless communication system 100. The example wireless communication system 100 includes three wireless communication devices—a first wireless communication device 102A, a second wireless communication device 102B, and a third wireless communication device 102C. The example wireless communication system 100 may include additional wireless communication devices and other components (e.g., additional wireless communication devices, one or more network servers, network routers, network switches, cables, or other communication links, etc.).

The example wireless communication devices 102A, 102B, 102C can operate in a wireless network, for example, according to a wireless network standard or another type of wireless communication protocol. For example, the wireless network may be configured to operate as a Wireless Local Area Network (WLAN), a Personal Area Network (PAN), a metropolitan area network (MAN), or another type of wireless network. Examples of WLANs include networks configured to operate according to one or more of the 802.11 family of standards developed by IEEE (e.g., Wi-Fi networks), and others. Examples of PANs include networks that operate according to short-range communication standards (e.g., BLUETOOTH®, Near Field Communication (NFC), ZigBee), millimeter wave communications, and others.

In some implementations, the wireless communication devices 102A, 102B, 102C may be configured to communicate in a cellular network, for example, according to a cellular network standard. Examples of cellular networks include networks configured according to 2G standards such as Global System for Mobile (GSM) and Enhanced Data rates for GSM Evolution (EDGE) or EGPRS; 3G standards such as Code Division Multiple Access (CDMA), Wideband Code Division Multiple Access (WCDMA), Universal Mobile Telecommunications System (UMTS), and Time Division Synchronous Code Division Multiple Access (TD-SCDMA); 4G standards such as Long-Term Evolution (LTE) and LTE-Advanced (LTE-A); and others.

In the example shown in FIG. 1, the wireless communication devices 102A, 102B, 102C can be, or they may include, standard wireless network components. For example, the wireless communication devices 102A, 102B, 102C may be commercially-available Wi-Fi access points or another type of wireless access point (WAP) performing one or more operations as described herein that are embedded as instructions (e.g., software or firmware) on the modem of the WAP. In some cases, the wireless communication devices 102A, 102B, 102C may be nodes of a wireless mesh network, such as, for example, a commercially-available mesh network system (e.g., GOOGLE WIFI). In some cases, another type of standard or conventional Wi-Fi transmitter device may be used. The wireless communication devices 102A, 102B, 102C may be implemented without Wi-Fi components; for example, other types of standard or non-standard wireless communication may be used for motion detection. In some cases, the wireless communication devices 102A, 102B, 102C can be, or they may be part of, a dedicated motion detection system. For example, the dedicated motion detection system can include a hub device and one or more beacon devices (as remote sensor devices), and the wireless communication devices 102A, 102B, 102C can be either a hub device or a beacon device in the motion detection system.

As shown in FIG. 1, the example wireless communication device 102C includes a modem 112, a processor 114, a memory 116, and a power unit 118; any of the wireless communication devices 102A, 102B, 102C in the wireless communication system 100 may include the same, additional or different components, and the components may be configured to operate as shown in FIG. 1 or in another manner. In some implementations, the modem 112, processor 114, memory 116, and power unit 118 of a wireless communication device are housed together in a common housing or other assembly. In some implementations, one or more of the components of a wireless communication device can be housed separately, for example, in a separate housing or other assembly.

The example modem 112 can communicate (receive, transmit, or both) wireless signals. For example, the modem 112 may be configured to communicate radio frequency (RF) signals formatted according to a wireless communication standard (e.g., Wi-Fi or Bluetooth). The modem 112 may be implemented as the example wireless network modem 112 shown in FIG. 1, or may be implemented in another manner, for example, with other types of components or subsystems. In some implementations, the example modem 112 includes a radio subsystem and a baseband subsystem. In some cases, the baseband subsystem and radio subsystem can be implemented on a common chip or chipset, or they may be implemented in a card or another type of assembled device. The baseband subsystem can be coupled to the radio subsystem, for example, by leads, pins, wires, or other types of connections.

In some cases, a radio subsystem in the modem 112 can include one or more antennas and radio frequency circuitry. The radio frequency circuitry can include, for example, circuitry that filters, amplifies or otherwise conditions analog signals, circuitry that up-converts baseband signals to RF signals, circuitry that down-converts RF signals to baseband signals, etc. Such circuitry may include, for example, filters, amplifiers, mixers, a local oscillator, etc. The radio subsystem can be configured to communicate radio frequency wireless signals on the wireless communication channels. As an example, the radio subsystem may include a radio chip, an RF front end, and one or more antennas. A radio subsystem may include additional or different components. In some implementations, the radio subsystem can be or include the radio electronics (e.g., RF front end, radio chip, or analogous components) from a conventional modem, for example, from a Wi-Fi modem, pico base station modem, etc. In some implementations, the antenna includes multiple antennas.

In some cases, a baseband subsystem in the modem 112 can include, for example, digital electronics configured to process digital baseband data. As an example, the baseband subsystem may include a baseband chip. A baseband subsystem may include additional or different components. In some cases, the baseband subsystem may include a digital signal processor (DSP) device or another type of processor device. In some cases, the baseband system includes digital processing logic to operate the radio subsystem, to communicate wireless network traffic through the radio subsystem, to detect motion based on motion detection signals received through the radio subsystem or to perform other types of processes. For instance, the baseband subsystem may include one or more chips, chipsets, or other types of devices that are configured to encode signals and deliver the encoded signals to the radio subsystem for transmission, or to identify and analyze data encoded in signals from the radio subsystem (e.g., by decoding the signals according to a wireless communication standard, by processing the signals according to a motion detection process, or otherwise).

In some instances, the radio subsystem in the example modem 112 receives baseband signals from the baseband subsystem, up-converts the baseband signals to radio frequency (RF) signals, and wirelessly transmits the radio frequency signals (e.g., through an antenna). In some instances, the radio subsystem in the example modem 112 wirelessly receives radio frequency signals (e.g., through an antenna), down-converts the radio frequency signals to baseband signals, and sends the baseband signals to the baseband subsystem. The signals exchanged between the radio subsystem and the baseband subsystem may be digital or analog signals. In some examples, the baseband subsystem includes conversion circuitry (e.g., a digital-to-analog converter, an analog-to-digital converter) and exchanges analog signals with the radio subsystem. In some examples, the radio subsystem includes conversion circuitry (e.g., a digital-to-analog converter, an analog-to-digital converter) and exchanges digital signals with the baseband subsystem.

In some cases, the baseband subsystem of the example modem 112 can communicate wireless network traffic (e.g., data packets) in the wireless communication network through the radio subsystem on one or more network traffic channels. The baseband subsystem of the modem 112 may also transmit or receive (or both) signals (e.g., motion probe signals or motion detection signals) through the radio subsystem on a dedicated wireless communication channel. In some instances, the baseband subsystem generates motion probe signals for transmission, for example, to probe a space for motion. In some instances, the baseband subsystem processes received motion detection signals (signals based on motion probe signals transmitted through the space), for example, to detect motion of an object in a space.

The example processor 114 can execute instructions, for example, to generate output data based on data inputs. The instructions can include programs, codes, scripts, or other types of data stored in memory. Additionally or alternatively, the instructions can be encoded as pre-programmed or re-programmable logic circuits, logic gates, or other types of hardware or firmware components. The processor 114 may be or include a general-purpose microprocessor, as a specialized co-processor or another type of data processing apparatus. In some cases, the processor 114 performs high level operation of the wireless communication device 102C. For example, the processor 114 may be configured to execute or interpret software, scripts, programs, functions, executables, or other instructions stored in the memory 116. In some implementations, the processor 114 may be included in the modem 112.

The example memory 116 can include computer-readable storage media, for example, a volatile memory device, a non-volatile memory device, or both. The memory 116 can include one or more read-only memory devices, random-access memory devices, buffer memory devices, or a combination of these and other types of memory devices. In some instances, one or more components of the memory can be integrated or otherwise associated with another component of the wireless communication device 102C. The memory 116 may store instructions that are executable by the processor 114. For example, the instructions may include instructions for time-aligning signals using an interference buffer and a motion detection buffer, such as through one or more of the operations of the example process 700 of FIGS. 7A-7C.

The example power unit 118 provides power to the other components of the wireless communication device 102C. For example, the other components may operate based on electrical power provided by the power unit 118 through a voltage bus or other connection. In some implementations, the power unit 118 includes a battery or a battery system, for example, a rechargeable battery. In some implementations, the power unit 118 includes an adapter (e.g., an AC adapter) that receives an external power signal (from an external source) and coverts the external power signal to an internal power signal conditioned for a component of the wireless communication device 102C. The power unit 118 may include other components or operate in another manner.

In the example shown in FIG. 1, the wireless communication devices 102A, 102B transmit wireless signals (e.g., according to a wireless network standard, a motion detection protocol, or otherwise). For instance, wireless communication devices 102A, 102B may broadcast wireless motion probe signals (e.g., reference signals, beacon signals, status signals, etc.), or they may send wireless signals addressed to other devices (e.g., a user equipment, a client device, a server, etc.), and the other devices (not shown) as well as the wireless communication device 102C may receive the wireless signals transmitted by the wireless communication devices 102A, 102B. In some cases, the wireless signals transmitted by the wireless communication devices 102A, 102B are repeated periodically, for example, according to a wireless communication standard or otherwise.

In the example shown, the wireless communication device 102C processes the wireless signals from the wireless communication devices 102A, 102B to detect motion of an object in a space accessed by the wireless signals, to determine a location of the detected motion, or both. For example, the wireless communication device 102C may perform one or more operations of the example processes described below with respect to FIGS. 3-9, or another type of process for detecting motion or determining a location of detected motion. The space accessed by the wireless signals can be an indoor or outdoor space, which may include, for example, one or more fully or partially enclosed areas, an open area without enclosure, etc. The space can be or can include an interior of a room, multiple rooms, a building, or the like. In some cases, the wireless communication system 100 can be modified, for instance, such that the wireless communication device 102C can transmit wireless signals and the wireless communication devices 102A, 102B can processes the wireless signals from the wireless communication device 102C to detect motion or determine a location of detected motion.

The wireless signals used for motion detection can include, for example, a beacon signal (e.g., Bluetooth Beacons, Wi-Fi Beacons, other wireless beacon signals), another standard signal generated for other purposes according to a wireless network standard, or non-standard signals (e.g., random signals, reference signals, etc.) generated for motion detection or other purposes. In some examples, the wireless signals propagate through an object (e.g., a wall) before or after interacting with a moving object, which may allow the moving object's movement to be detected without an optical line-of-sight between the moving object and the transmission or receiving hardware. Based on the received signals, the third wireless communication device 102C may generate motion detection data. In some instances, the third wireless communication device 102C may communicate the motion detection data to another device or system, such as a security system, that may include a control center for monitoring movement within a space, such as a room, building, outdoor area, etc.

In some implementations, the wireless communication devices 102A, 102B can be modified to transmit motion probe signals (which may include, e.g., a reference signal, beacon signal, or another signal used to probe a space for motion) on a separate wireless communication channel (e.g., a frequency channel or coded channel) from wireless network traffic signals. For example, the modulation applied to the payload of a motion probe signal and the type of data or data structure in the payload may be known by the third wireless communication device 102C, which may reduce the amount of processing that the third wireless communication device 102C performs for motion sensing. The header may include additional information such as, for example, an indication of whether motion was detected by another device in the communication system 100, an indication of the modulation type, an identification of the device transmitting the signal, etc.

In the example shown in FIG. 1, the wireless communication system 100 is a wireless mesh network, with wireless communication links between each of the respective wireless communication devices 102. In the example shown, the wireless communication link between the third wireless communication device 102C and the first wireless communication device 102A can be used to probe a first motion detection field 110A, the wireless communication link between the third wireless communication device 102C and the second wireless communication device 102B can be used to probe a second motion detection field 110B, and the wireless communication link between the first wireless communication device 102A and the second wireless communication device 102B can be used to probe a third motion detection field 110C. In some instances, each wireless communication device 102 detects motion in the motion detection fields 110 accessed by that device by processing received signals that are based on wireless signals transmitted by the wireless communication devices 102 through the motion detection fields 110. For example, when the person 106 shown in FIG. 1 moves in the first motion detection field 110A and the third motion detection field 110C, the wireless communication devices 102 may detect the motion based on signals they received that are based on wireless signals transmitted through the respective motion detection fields 110. For instance, the first wireless communication device 102A can detect motion of the person in both motion detection fields 110A, 110C, the second wireless communication device 102B can detect motion of the person 106 in the motion detection field 110C, and the third wireless communication device 102C can detect motion of the person 106 in the motion detection field 110A.

In some instances, the motion detection fields 110 can include, for example, air, solid materials, liquids, or another medium through which wireless electromagnetic signals may propagate. In the example shown in FIG. 1, the first motion detection field 110A provides a wireless communication channel between the first wireless communication device 102A and the third wireless communication device 102C, the second motion detection field 110B provides a wireless communication channel between the second wireless communication device 102B and the third wireless communication device 102C, and the third motion detection field 110C provides a wireless communication channel between the first wireless communication device 102A and the second wireless communication device 102B. In some aspects of operation, wireless signals transmitted on a wireless communication channel (separate from or shared with the wireless communication channel for network traffic) are used to detect movement of an object in a space. The objects can be any type of static or moveable object, and can be living or inanimate. For example, the object can be a human (e.g., the person 106 shown in FIG. 1), an animal, an inorganic object, or another device, apparatus, or assembly), an object that defines all or part of the boundary of a space (e.g., a wall, door, window, etc.), or another type of object. In some implementations, motion information from the wireless communication devices may be analyzed to determine a location of the detected motion. For example, as described further below, one of the wireless communication devices 102 (or another device communicably coupled to the devices 102) may determine that the detected motion is nearby a particular wireless communication device.

Figure 2:
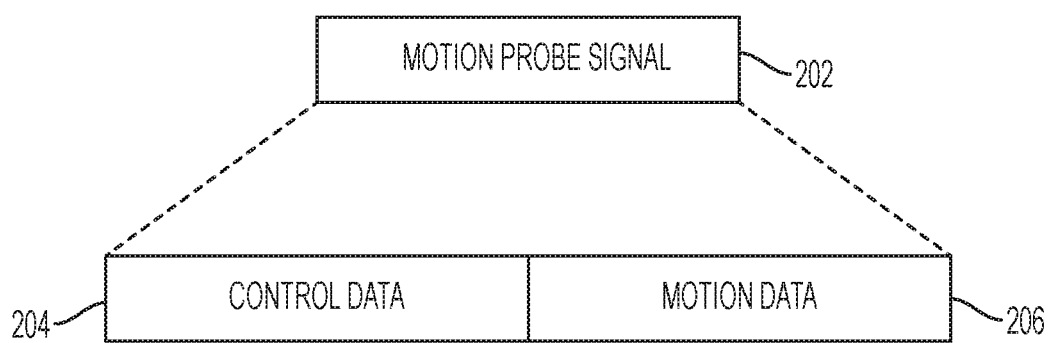
FIG. 2 is a diagram showing an example motion probe signal.

FIG. 2 illustrates an example motion probe signal 202. The example motion probe signal 202 can be transmitted, for example, in a wireless communication system to monitor for motion in a space. In some examples, the motion probe signal 202 is implemented as a packet. For instance, the motion probe signal 202 can include binary data that is converted to an analog signal, up-converted to radio frequency, and wirelessly transmitted by an antenna.

The motion probe signal 202 shown in FIG. 2 includes control data 204 and a motion data 206. A motion probe signal 202 may include additional or different features, and may be formatted in another manner. In the example shown, the control data 204 may include the type of control data that would be included in a conventional data packet. For instance, the control data 204 may include a preamble (also called a header) indicating the type of information contained in the motion probe signal 202, an identifier of a wireless device transmitting the motion probe signal 202, a MAC address of a wireless device transmitting the motion probe signal 202, a transmission power, etc. The motion data 206 is the payload of the motion probe signal 202. In some implementations, the motion data 206 can be or include, for example, a pseudorandom code or another type of reference signal. In some implementations, the motion data 206 can be or include, for example, a beacon signal broadcast by a wireless network system.

In an example, the motion probe signal 202 is transmitted by a wireless device (e.g., the wireless communication device 102A shown in FIG. 1) and received at a motion detection device (e.g., the wireless communication device 102C shown in FIG. 1). In some cases, the control data 204 changes with each transmission, for example, to indicate the time of transmission or updated parameters. The motion data 206 can remain unchanged in each transmission of the motion probe signal 202. The receiving wireless communication device can process the received signals based on each transmission of the motion probe signal 202, and analyze the motion data 206 for changes. For instance, changes in the motion data 206 may indicate movement of an object in a space accessed by the wireless transmission of the motion probe signal 202. The motion data 206 can then be processed, for example, to generate a response to the detected motion.

FIGS. 3A and 3B are diagrams showing example wireless signals communicated between wireless communication devices 304A, 304B, 304C. The wireless communication devices 304A, 304B, 304C can be, for example, the wireless communication devices 102A, 102B, 102C shown in FIG. 1, or other types of wireless communication devices. The example wireless communication devices 304A, 304B, 304C transmit wireless signals through a space 300. The example space 300 can be completely or partially enclosed or open at one or more boundaries of the space 300. The space 300 can be or can include an interior of a room, multiple rooms, a building, an indoor area, outdoor area, or the like. A first wall 302A, a second wall 302B, and a third wall 302C at least partially enclose the space 300 in the example shown.

In the example shown in FIGS. 3A and 3B, the first wireless communication device 304A is operable to transmit wireless signals repeatedly (e.g., periodically, intermittently, at scheduled, unscheduled or random intervals, etc.). The transmitted signals may be formatted like the motion probe signal 202 of FIG. 2, or in another manner. The second and third wireless communication devices 304B, 304C are operable to receive signals based on those transmitted by the wireless communication device 304A. The wireless communication devices 304B, 304C each have a modem (e.g., the modem 112 shown in FIG. 1) that is configured to process received signals to detect motion of an object in the space 300.

As shown, an object is in a first position 314A in FIG. 3A, and the object has moved to a second position 314B in FIG. 3B. In FIGS. 3A and 3B, the moving object in the space 300 is represented as a human, but the moving object can be another type of object. For example, the moving object can be an animal, an inorganic object (e.g., a system, device, apparatus, or assembly), an object that defines all or part of the boundary of the space 300 (e.g., a wall, door, window, etc.), or another type of object.

As shown in FIGS. 3A and 3B, multiple example paths of the wireless signals transmitted from the first wireless communication device 304A are illustrated by dashed lines. Along a first signal path 316, the wireless signal is transmitted from the first wireless communication device 304A and reflected off the first wall 302A toward the second wireless communication device 304B. Along a second signal path 318, the wireless signal is transmitted from the first wireless communication device 304A and reflected off the second wall 302B and the first wall 302A toward the third wireless communication device 304C. Along a third signal path 320, the wireless signal is transmitted from the first wireless communication device 304A and reflected off the second wall 302B toward the third wireless communication device 304C. Along a fourth signal path 322, the wireless signal is transmitted from the first wireless communication device 304A and reflected off the third wall 302C toward the second wireless communication device 304B.

In FIG. 3A, along a fifth signal path 324A, the wireless signal is transmitted from the first wireless communication device 304A and reflected off the object at the first position 314A toward the third wireless communication device 304C. Between FIGS. 3A and 3B, a surface of the object moves from the first position 314A to a second position 314B in the space 300 (e.g., some distance away from the first position 314A). In FIG. 3B, along a sixth signal path 324B, the wireless signal is transmitted from the first wireless communication device 304A and reflected off the object at the second position 314B toward the third wireless communication device 304C. The sixth signal path 324B depicted in FIG. 3B is longer than the fifth signal path 324A depicted in FIG. 3A due to the movement of the object from the first position 314A to the second position 314B. In some examples, a signal path can be added, removed, or otherwise modified due to movement of an object in a space.

The example wireless signals shown in FIGS. 3A and 3B may experience attenuation, frequency shifts, phase shifts, or other effects through their respective paths and may have portions that propagate in another direction, for example, through the walls 302A, 302B, and 302C. In some examples, the wireless signals are radio frequency (RF) signals. The wireless signals may include other types of signals.

In the example shown in FIGS. 3A and 3B, the first wireless communication device 304A can repeatedly transmit a wireless signal. In particular, FIG. 3A shows the wireless signal being transmitted from the first wireless communication device 304A at a first time, and FIG. 3B shows the same wireless signal being transmitted from the first wireless communication device 304A at a second, later time. The transmitted signal can be transmitted continuously, periodically, at random or intermittent times or the like, or a combination thereof. The transmitted signal can have a number of frequency components in a frequency bandwidth. The transmitted signal can be transmitted from the first wireless communication device 304A in an omni-directional manner, in a directional manner or otherwise. In the example shown, the wireless signals traverse multiple respective paths in the space 300, and the signal along each path may become attenuated due to path losses, scattering, reflection, or the like and may have a phase or frequency offset.

As shown in FIGS. 3A and 3B, the signals from various paths 316, 318, 320, 322, 324A, and 324B combine at the third wireless communication device 304C and the second wireless communication device 304B to form received signals. Because of the effects of the multiple paths in the space 300 on the transmitted signal, the space 300 may be represented as a transfer function (e.g., a filter) in which the transmitted signal is input and the received signal is output. When an object moves in the space 300, the attenuation or phase offset affected upon a signal in a signal path can change, and hence, the transfer function of the space 300 can change. Assuming the same wireless signal is transmitted from the first wireless communication device 304A, if the transfer function of the space 300 changes, the output of that transfer function—the received signal—will also change. A change in the received signal can be used to detect movement of an object.

Mathematically, a transmitted signal f(t) transmitted from the first wireless communication device 304A may be described according to Equation (1):

$$f(t) = \sum_{n=-\infty}^{\infty} c_n e^{j\omega_n t} \tag{1}$$

where $\omega_n$ represents the frequency of $n^{th}$ frequency component of the transmitted signal, $c_n$ represents the complex coefficient of the $n^{th}$ frequency component, and t represents time. With the transmitted signal f(t) being transmitted from the first wireless communication device 304A, an output signal $r_k(t)$ from a path k may be described according to Equation (2):

$$r_k(t) = \sum_{n=-\infty}^{\infty} \alpha_{n,k} c_n e^{j(\omega_n t + \phi_{n,k})} \tag{2}$$

where $\alpha_{n,k}$ represents an attenuation factor (or channel response; e.g., due to scattering, reflection, and path losses) for the $n^{th}$ frequency component along path k, and $\varphi_{n,k}$ represents the phase of the signal for $n^{th}$ frequency component along path k. Then, the received signal R at a wireless communication device can be described as the summation of all output signals $r_k(t)$ from all paths to the wireless communication device, which is shown in Equation (3):

$$R = \sum_k r_k(t) \tag{3}$$

Substituting Equation (2) into Equation (3) renders the following Equation (4):

$$R = \sum_k \sum_{n=-\infty}^{\infty} \left(\alpha_{n,k} e^{j\phi_{n,k}}\right) c_n e^{j\omega_n t} \tag{4}$$

The received signal R at a wireless communication device can then be analyzed. The received signal R at a wireless communication device can be transformed to the frequency domain, for example, using a Fast Fourier Transform (FFT) or another type of algorithm. The transformed signal can represent the received signal R as a series of n complex values, one for each of the respective frequency components (at the n frequencies $\omega_n$). For a frequency component at frequency $\omega_n$, a complex value $H_n$ may be represented as follows in Equation (5):

$$H_n = \sum_k c_n \alpha_{n,k} e^{j\phi_{n,k}}. \tag{5}$$

The complex value $H_n$ for a given frequency component $\omega_n$ indicates a relative magnitude and phase offset of the received signal at that frequency component $\omega_n$. When an object moves in the space, the complex value $H_n$ changes due to the channel response $\alpha_{n,k}$ of the space changing. Accordingly, a change detected in the channel response can be indicative of movement of an object within the communication channel. In some instances, noise, interference, or other phenomena can influence the channel response detected by the receiver, and the motion detection system can reduce or isolate such influences to improve the accuracy and quality of motion detection capabilities. In some implementations, the overall channel response can be represented as:

$$h_{ch} = \sum_k \sum_{n=-\infty}^{\infty} \alpha_{n,k}. \tag{6}$$

In some instances, the channel response $h_{ch}$ for a space can be determined, for example, based on the mathematical theory of estimation. For instance, a reference signal $R_{ef}$ can be modified with candidate channel responses ($h_{ch}$), and then a maximum likelihood approach can be used to select the candidate channel which gives best match to the received signal ($R_{cvd}$). In some cases, an estimated received signal ($\hat{R}_{cvd}$) is obtained from the convolution of the reference signal ($R_{ef}$) with the candidate channel responses ($h_{ch}$), and then the channel coefficients of the channel response ($h_{ch}$) are varied to minimize the squared error of the estimated received signal ($\hat{R}_{cvd}$). This can be mathematically illustrated as:

$$\hat{R}_{cvd} = R_{ef} \oplus h_{ch} = \sum_{k=-m}^{m} R_{ef}(n-k)h_{ch}(k) \quad (7)$$

with the optimization criterion $$\min_{h_{ch}} \sum (\hat{R}_{cvd} - R_{cvd})^2. \quad (8)$$

The minimizing, or optimizing, process can utilize an adaptive filtering technique, such as Least Mean Squares (LMS), Recursive Least Squares (RLS), Batch Least Squares (BLS), etc. The channel response can be a Finite Impulse Response (FIR) filter, Infinite Impulse Response (IIR) filter, or the like.

As shown in the equation above, the received signal can be considered as a convolution of the reference signal and the channel response. The convolution operation means that the channel coefficients possess a degree of correlation with each of the delayed replicas of the reference signal. The convolution operation as shown in the equation above, therefore shows that the received signal appears at different delay points, each delayed replica being weighted by the channel coefficient.

In some aspects, a signal quality metric may be determined for received signals based on the channel response. For example, a determined channel response ($h_{ch}$) for a space may be applied to a reference signal ($R_{ef}$) to yield an estimated received signal ($\hat{R}_{cvd}$), which is an estimation of what the received signal should be based on the channel response (e.g., based on convolution of the reference signal ($R_{ef}$) with the channel response ($h_{ch}$) as described above). The estimated received signal ($\hat{R}_{cvd}$) and the actual received signal ($R_{cvd}$) may be used to compute a signal quality metric. In some examples, for instance, the signal quality metric is based on (e.g., is set equal to, is computed from, is representative of, etc.) a value Q that is determined by computing the dot product of the actual received signal ($R_{cvd}$) and the difference between the estimated received signal ($\hat{R}_{cvd}$) and the actual received signal ($R_{cvd}$), e.g.:

$$Q = R_{cvd} \cdot (\hat{R}_{cvd} - R_{cvd}). \quad (9)$$

In some cases, received signals may be "rejected" by a wireless communication device. For example, in some implementations, a motion detection process may include quality criterion for signals. Received signals that do not meet the quality criterion may be rejected (e.g., discarded or ignored) and not considered in determining whether motion has occurred in the space 300. The signals may be accepted or rejected as inputs to the motion detection process based on the signal quality metric (e.g., the value Q described by Equation (9)). For instance, in some cases, motion is detected using only a subset of received signals that have values Q above a certain threshold.

Figure 4:
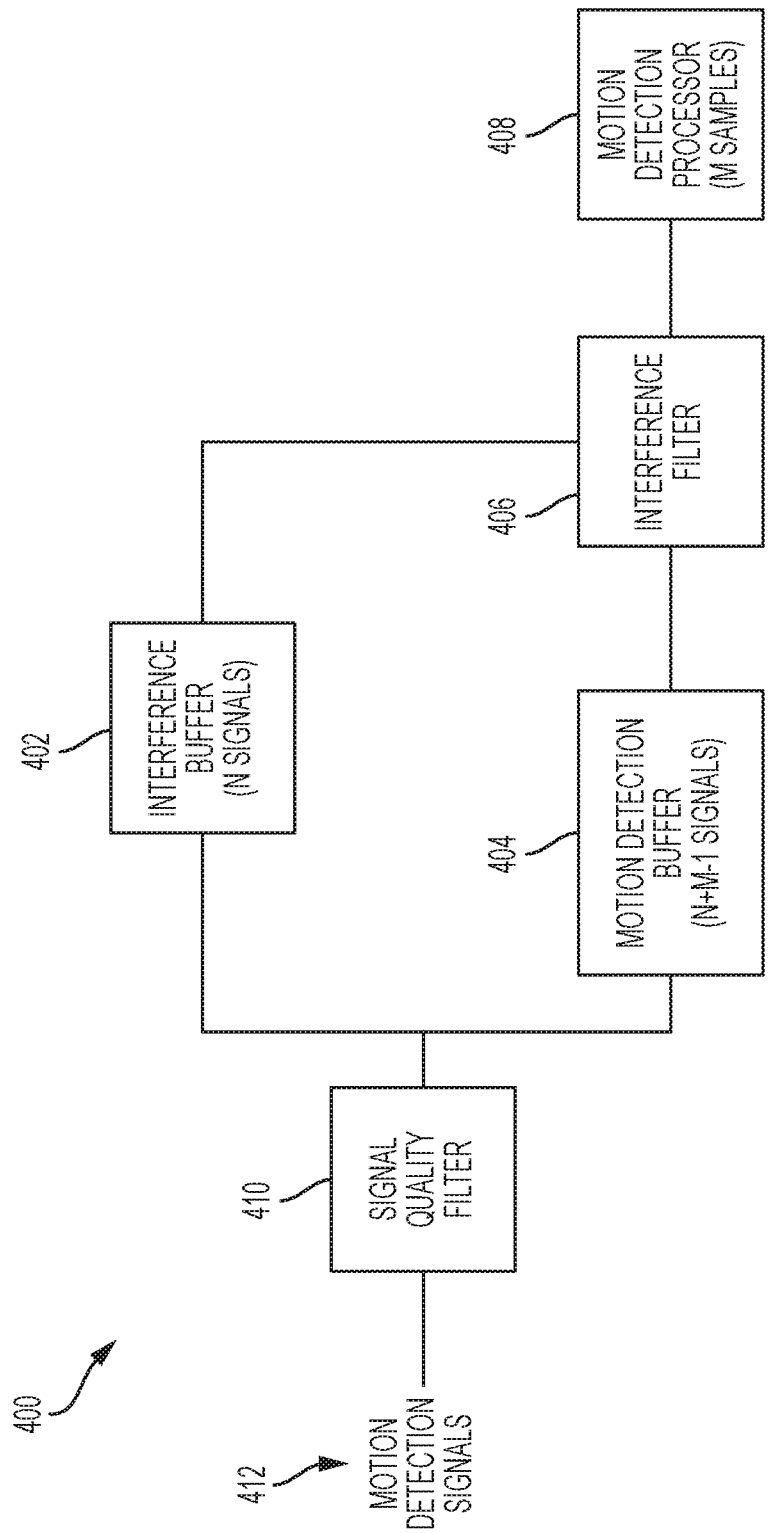
FIG. 4 is a diagram showing an example motion detection system that includes a motion detection buffer and an interference buffer.

FIG. 4 is a diagram showing an example motion detection system 400 that includes a motion detection buffer 404 and an interference buffer 402. In some implementations, the system 400 can be included in a wireless communication device (for example, wireless communication device 304C shown in FIGS. 3A and 3B) and can receive wireless signals based on those transmitted by another wireless communication device (for example, wireless communication device 304A). In some cases, the system 400 implements a time alignment process on the motion detection signals 412. For instance, in some implementations, the system 400 provides the motion detection signals 412 to the interference buffer 402 and the motion detection buffer 404 to time-align the signals, and based on the interference filter 406 applied to the signals in the interference buffer 402, signals in the motion detection buffer 403 are provided to the motion detection processor 408 for analysis. The motion detection signals 412 received by the system 400 may be based on a motion probe signal (e.g., the motion probe signal 202 shown in FIG. 2) transmitted through a space (e.g., the space 300 shown in FIGS. 3A-3B). For instance, each motion detection signal 412 may be based on a respective motion probe signal transmitted through the space. The motion detection signal 412 may differ from the motion probe signal based on the channel response, as described above. The motion detection signals 412 may be obtained from a modem of a wireless communication device (e.g., the modem 112 of FIG. 1).

In the example shown, the motion detection signals 412 are input to the signal quality filter 410. The signal quality filter 410 analyzes the motion detection signals 412 based on one or more quality criterion. For example, the signal quality filter 410 may determine a signal quality metric value (e.g., the value Q described by Equation (9) above) for each motion detection signal 412, and compare the signal quality metric value with the quality criterion. The signal quality filter 410 either accepts or rejects the motion detection signals 412 based on the comparison with the quality criterion. For instance, the signal quality filter 410 may reject the motion detection signal 412 when the comparison result indicates that the signal quality metric value Q for the motion detection signal fails to meet the quality criterion, such as, for example, when the Q value is less than a signal quality metric threshold value. The signal quality filter 410 accepts the motion detection signal 412 when the comparison result indicates that the Q value for the sample meets the quality criterion, for example, when Q value is greater than the signal quality metric threshold value. If accepted, the motion detection signal 412 is input to both the motion detection buffer 404 and the interference buffer 402. In certain implementations, the system 400 does not include the signal quality filter 410.

In the example shown, the interference buffer 402 includes N data blocks that and the motion detection buffer 404 includes N+M−1 data blocks, where M≤N. Each data block of the interference buffer 402 and the motion detection buffer 404 can store a motion detection signal 412. The buffers 402, 404 are filled in a first-in/first-out fashion. For example, a motion detection signal 412 received first is stored in a first data block of the interference buffer 402 until a second motion detection signal 412 is received, at which time the motion detection signal 412 received first is stored in a second data block of the interference buffer 402 while the second motion detection signal 412 is stored in the first data block, and so forth until the motion detection signal 412 received first is stored in the $N^{th}$ data block of the interference buffer 402.

Once the interference buffer 402 is full, the interference filter 406 determines a wireless interference level in the motion detection signals 412. For example, the interference filter may apply an interference filter function f(x) to the N motion detection signals stored in the interference buffer 402. In some implementations, the interference filter 406 accesses the set of N motion detection signals in interference buffer 402 in response to determining that the interference buffer 402 is full. The wireless interference metric determined by the interference filter 406 can be stored in correspondence to each of N motion detection signals used in the detection. The wireless interference level determined by the interference filter 406 represents a wireless interference level corresponding to a period time during which the motion detection signals 412 were received. For example, the interference filter 406 may determine a first wireless interference metric corresponding to a first set of N input signals loaded into the interference buffer 402 over a time period ($t_1$-$t_N$) by applying the interference filter function f(x) to the first set of N input signals, and a second wireless interference metric for a second set of N input signals loaded into the interference buffer 402 over a time period ($t_{N+1}$-$t_{2N}$) by applying the interference filter function f(x) to the second set of N input signals.

The interference filter 406 then compares the wireless interference level with a threshold (e.g., compares the interference metric with a threshold interference value). If the wireless interference metric is at or above the threshold interference value, the system 400 prevents the motion detection processor 408 from executing the motion detection process on the signals in the motion detection buffer 408. That is, the interference filter 406 blocks the motion detection processor 408 from applying a motion detection process to any of the N motion detection signals in the motion detection buffer 404 corresponding to the N motion detection signals in the interference buffer 402. By blocking execution, the interference filter 406 ensures that the motion detection processor 408 does not execute a motion detection process on noisy signals (i.e., signals having an unacceptably high wireless interference level). On the other hand, if the wireless interference metric is below the threshold interference value, the interference filter 406 allows execution of the motion detection process on the corresponding N motion detection signals in the motion detection buffer 404. In some instances, the interference buffer 402 may be cleared after the interference filter 406 runs on the N signals, and a second set of motion detection signals 412 is loaded into the interference buffer 402. The interference filter 406 can repeat the process of detecting that the interference buffer 402 is full, determining a wireless interference level, and allowing/preventing execution of the motion detection process on the new set of N motion detection signals by the motion detection processor 408.

In some instances, the interference filter 406 can include or perform the function of an interference gate (e.g., logic gate; AND gate) by selectively: (i) allowing the motion detection processor 408 to execute the motion detection process on a subset (e.g., M signals) of the N+M−1 motion detection signals stored in the motion detection buffer 404; or (ii) blocking the motion detection processor 408 from executing the motion detection process on the subset M. In some instances, the interference filter 406 evaluates the past N moments as a collection before the motion detection processor 408 executes the motion detection process using a subset M of the N moments.

FIGS. 5A through 5E (together referred to as FIG. 5) are diagrams showing an example process of loading an interference buffer 502 and a motion detection buffer 504. The example process begins at a first point in time (t=1) and goes through an end of a first time period (t=N) and through an end of a second time period (t=2N). The interference buffer 502 of FIG. 5 can be the same as or similar to the interference buffer 402 shown in FIG. 4, and the motion detection buffer 504 of FIG. 5 can be the same as or similar to the motion detection buffer 404 shown in FIG. 4. The example interference buffer 502 includes N data blocks configured to respectively store N motion detection signals, for example, the motion detection signals 412 of FIG. 4. The motion detection buffer 504 includes N+M−1 data blocks configured to respectively store N+M−1 motion detection signals, for example, the motion detection signals 412 of FIG. 4. In the example shown, the interference buffer 502 and motion detection buffer 504 are loaded in a first-in/first-out fashion.

FIG. 5A is a diagram showing an interference buffer 502 and a motion detection buffer 504 at one point in time (t=1). At t=1, the input signal represented as a sample S(i) having an index i=1 is loaded into the first data blocks 505 and 508 of the interference buffer 502 and motion detection buffer 504, respectively. The remainder of the data blocks are empty in the interference buffer 502 and motion detection buffer 504. In the example shown, the first data blocks 505 and 508 have an index of 1.

FIG. 5B is a diagram showing the interference buffer 502 and the motion detection buffer 504 at the $N^{th}$ point in time (t=N) when the interference buffer 502 is full of a first set of input signals. In this example, the latest input signal, namely, the $N^{th}$ input signal S(N), is loaded into the first data blocks 505 and 508 of the interference buffer 502 and motion detection buffer 504, respectively. The first input signal S(1) is loaded into the $N^{th}$ data blocks 516 and 518 of the interference buffer 502 and motion detection buffer 504, respectively. In the example shown, the second data blocks 510 and 512 of the interference buffer 502 and motion detection buffer 504, respectively, have an index of 2; the penultimate data block 514 of the interference buffer 502 has an index of N−1; the $N^{th}$ data blocks 516 and 518 of the interference buffer 502 and motion detection buffer 504, respectively, have an index of N; and the last data block 520 of the motion detection buffer 504 has an index of N+M−1. In the example shown, the N data blocks in the interference buffer 502 are full and the 1-$N^{th}$ data blocks in the motion detection buffer 504 are loaded identically as the N data blocks in the interference buffer 502 (loaded with signals S(1) through S(N)). The remainder of the data blocks in the motion detection buffer 504 are empty.

A subset 506 of M data blocks within the motion detection buffer 504 are accessible to a motion detection processor, for example, the motion detection processor 408 of FIG. 4. The motion detection processor can determine that the subset 506 of M data blocks is full by detecting that a data block of interest is loaded with a sample. As an example, the data block of interest can be the last data block 520 of the motion detection buffer 504. In the example shown, the $N^{th}$ data block 518 of the motion detection buffer 504 is the first data block of the subset 506 of M data blocks within the motion detection buffer 504.

After the interference buffer 502 becomes full (between t=N and t=N+1), an interference filter function f(x) is applied to the set of N signals {S(N), S(N−1), . . . , S(2), S(1)} within the full interference buffer 502. An interference gate (described below) can hold the result of the interference filter function as its output, and control whether or not a motion detection process is executed on the M data blocks 506 of the motion detection buffer 504. After the interference filter function is run, the interference buffer 502 is cleared.

FIG. 5C is a diagram showing the interference buffer 502 and the motion detection buffer 504 at the N+1$^{th}$ point in time (t=N+1) after the motion detection buffer 504 has been filled with the first set of input signals. In this example, the latest input signal, namely, the N+1$^{th}$ input signal S(N+1), is loaded into the first data blocks 505 and 508 of the interference buffer 502 and motion detection buffer 504, respectively. The remainder of the data blocks are empty in the interference buffer 502. The motion detection buffer 504 continues to be filled in a first-in/first-out manner, even after the interference buffer 502 is cleared and reloaded. At the N+1$^{th}$ point in time (t=N+1), the first set of input signals {S(N), S(N−1), . . . , S(2), S(1)} are loaded into the N data blocks of the motion detection buffer 504 that have indices i=2 . . . N+1. That is, the first input signal S(1) is loaded into the second data block 522 within the subset 506 of M data blocks; and the second input signal S(2) is loaded into the first data block (namely, the N$^{th}$ data block 518) of the subset 506 of M data blocks. The remainder of the data blocks in motion detection buffer 504 are empty.

FIG. 5D is a diagram showing the interference buffer 502 and the motion detection buffer 504 of at the N+M−1$^{th}$ point in time (t=N+M−1) when the motion detection buffer has become full. In this example, the interference buffer 502 is loaded with a second set of N motion detection signals; the motion detection buffer 504 is full; and a motion detection process may be executed on the set of M samples {S(M), S(M−1), . . . , S(2), S(1)} loaded in the subset 506 of M data blocks in the motion detection buffer 504 (e.g., in response to a determination that a level of interference in the first set of N signals is below a threshold, as described above). That is, when the subset 506 of M data blocks is full, and based on the output of an interference function filter (e.g., interference gate within the interference filter 406 of FIG. 4), the motion detection processor executes (or is blocked from executing) a motion detection process on the subset 506 to detect motion that occurred in a space (e.g., space 300 of FIGS. 3A and 3B). The motion detection system continues the cycle of: (i) loading the latest input signal into the first data blocks 505 and 508 of the interference buffer 502 and motion detection buffer 504, respectively, in a first-in/first-out manner; and (ii) executing (or blocking execution of) a motion detection process on the set of M samples loaded in the subset 506 of M data blocks, based on the output of an interference function filter (e.g., interference gate).

Figure 5E:
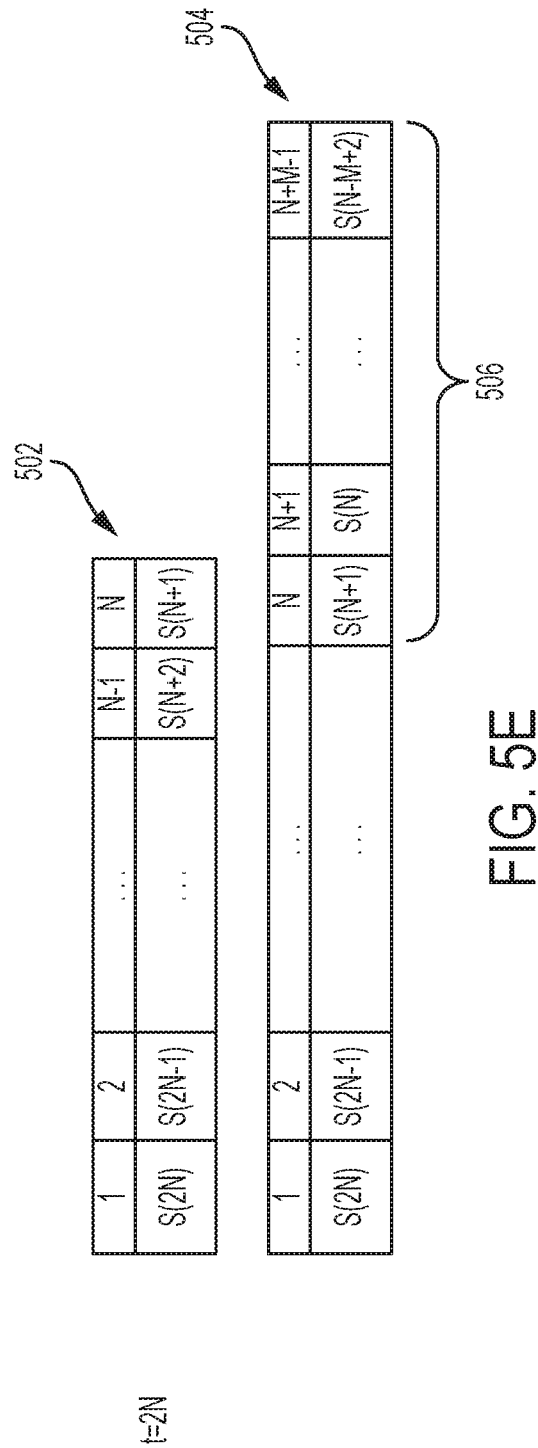
Figure 6A:
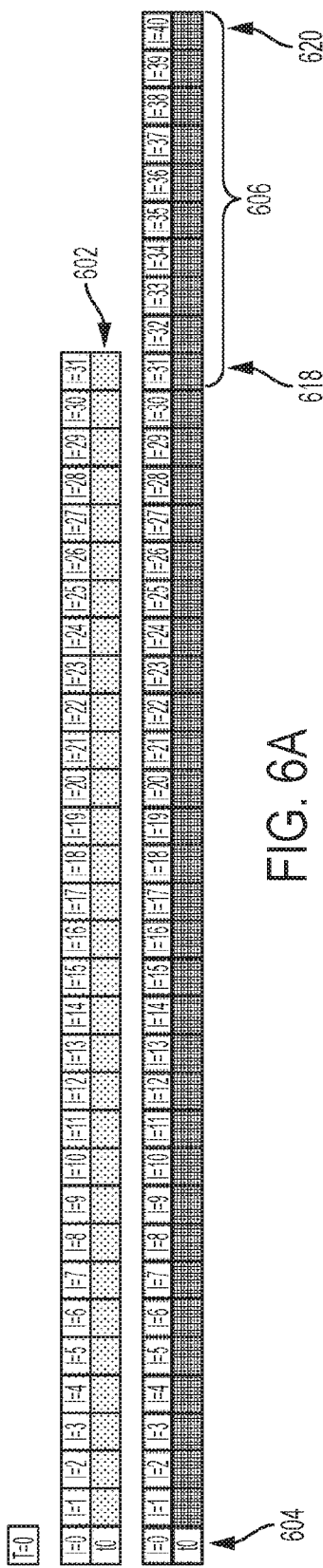
Figure 6B:
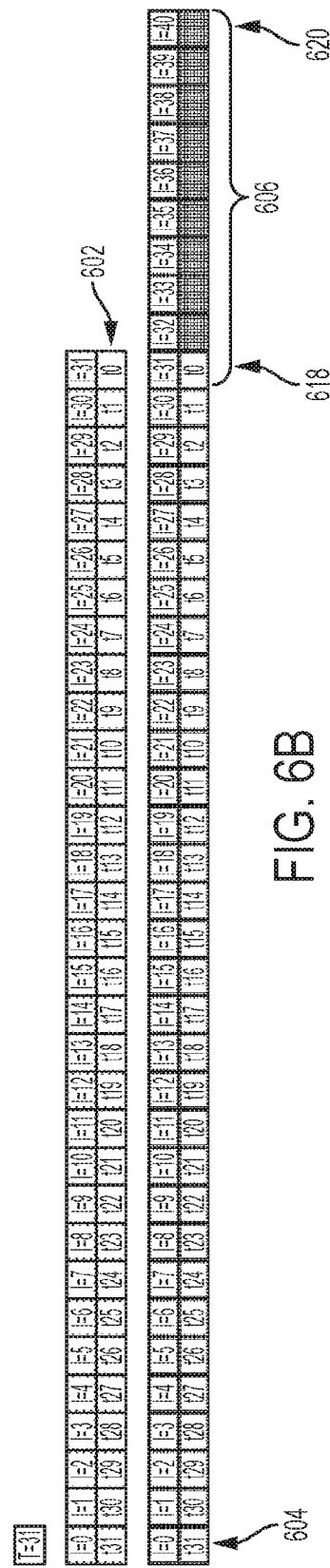

FIG. 5E is a diagram showing the interference buffer 502 and the motion detection buffer 504 at the 2N$^{th}$ point in time (t=2N) when the interference buffer 502 is full of a second set of signals {S(2N), S(2N−1), . . . , S(N+1)), S(N+1)} and the motion detection buffer 504 has been filled with signals from the first and second sets of signals. In this example, the latest input signal, namely, the 2N$^{th}$ input signal S(2N), is loaded into the first data blocks 505 and 508 of the interference buffer 502 and motion detection buffer 504, respectively. The N+1$^{th}$ input signal S(N+1) is loaded into the N$^{th}$ data blocks 516 and 518 of the interference buffer 502 and motion detection buffer 504. The first through N$^{th}$ data blocks in the motion detection buffer 504 are loaded identically as the N data blocks in the interference buffer 502, namely loaded with samples S(2N) through S(N+1). The remainder of the data blocks are full in the motion detection buffer 504, namely, filled with samples {S(N+1), S(N), . . . , S(N−M+3), S(N−M+2)} from the second set of input signals. The interference filter function f(x) is applied to the second set of N samples {S(2N), S(2N−1), . . . , S(N+2)), S(N+1)} within the full interference buffer 502, and based on the result of the interference filter function, the interference gate controls whether or not a motion detection process is executed on the subset 506 of M data blocks within the motion detection buffer 504, as described above.

Although FIGS. 5A through 5E show one example of loading an interference buffer 502 and a motion detection buffer 504 from a first point in time (t=1) through an end of a first time period (t=N) and through an end of a second time period (t=2N), various changes can be made to FIG. 5. For example, the N data blocks of the interference buffer can have indices from i=0 to i=N−1, as shown in the interference buffer 602 of FIGS. 6A-6H, where N=32 and M=41. As another example, the N+M−1 data blocks of the motion detection buffer can have indices from i=1 to i=40, as shown in the motion detection buffer 604 of FIGS. 6A-6H. As another example, the input signals loaded into the interference buffer and motion detection buffer can be represented by a sample corresponding to a time index. Referring to FIGS. 6A-6H, the input signal received first could be represented by time index t0; the second input signal could be represented by time index t1; the N$^{th}$ input signal could be represented as a sample corresponding to the N$^{th}$ point in time t31; the first input signal of a second set of N input signals could be represented as a sample corresponding to the N+1$^{th}$ time index t32; and the 2N$^{th}$ input signal could be represented as a sample corresponding to the 2N$^{th}$ point in time t63. As a further example, the subset of M data blocks within the motion detection buffer could be the subset 506, which includes the N$^{th}$ data block 618 having an index i=31 and includes the last data block 620 of the motion detection buffer 604 has an index i=N+M−1=40.

FIGS. 6A through 6H are diagrams showing another example process of loading an interference buffer 602 and a motion detection buffer 604. In particular, FIGS. 6A, 6B, 6C, 6D, 6E, 6F, 6G, and 6H are diagrams showing the interference buffer 602 and the motion detection buffer 604 at times, T=0, T=31=N−1, T=40=N+M−1, T=41=M+N, T=42=M+N+1, T=43=M+N+2, T=62=2N−2, and T=63=2N−1, respectively. In the examples shown, the interference buffer 602 and motion detection buffer 604 are loaded with motion detection signals in the same manner as described above with respect to the interference buffer 502 and motion detection buffer 504 of FIG. 5.

Figure 7A:
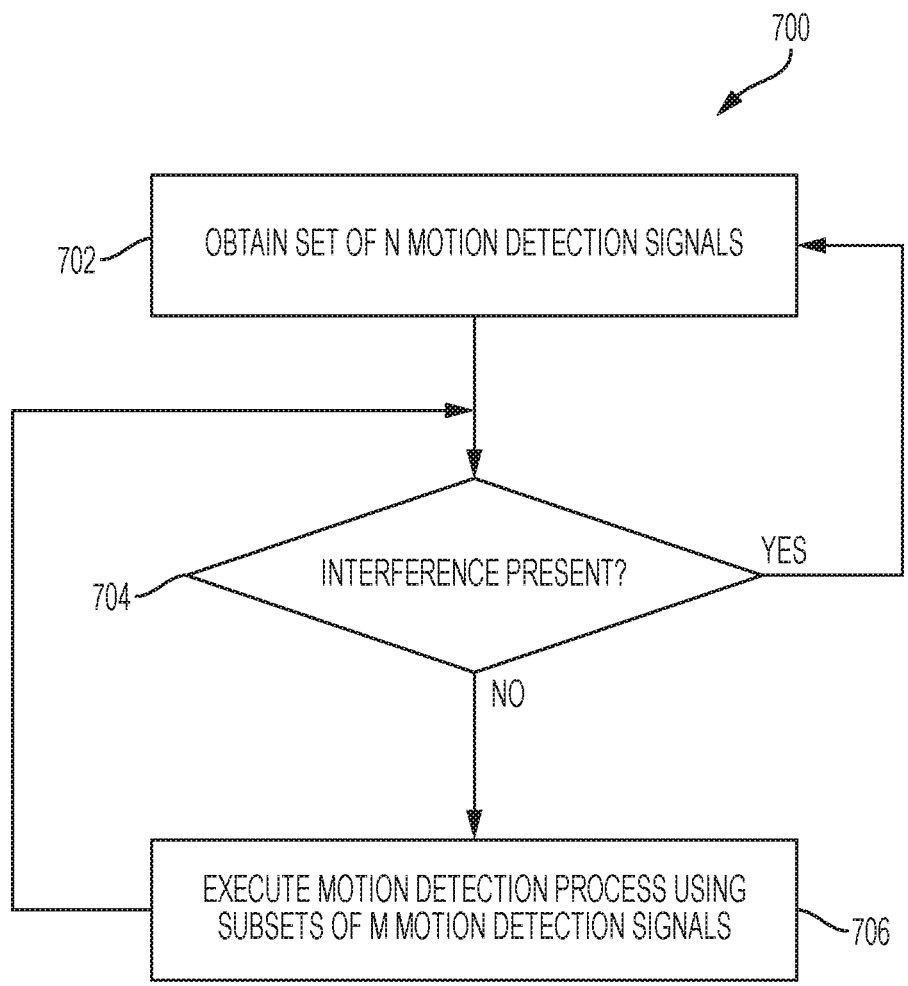
FIGS. 7A-7C are flow diagrams showing an example process of time-aligning time motion detection signals.
Figure 7B:
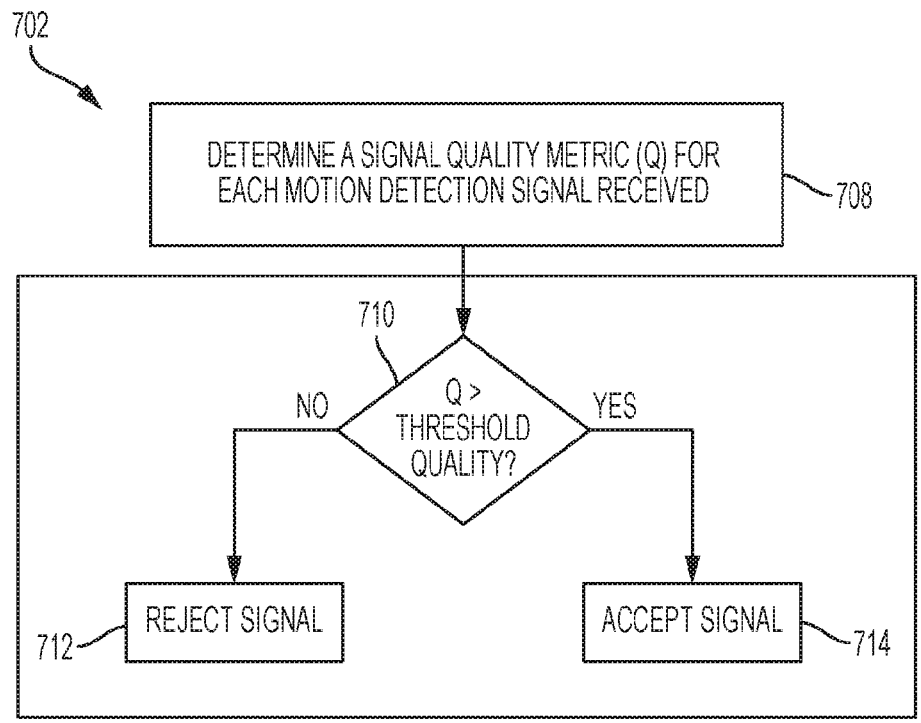
Figure 7C:
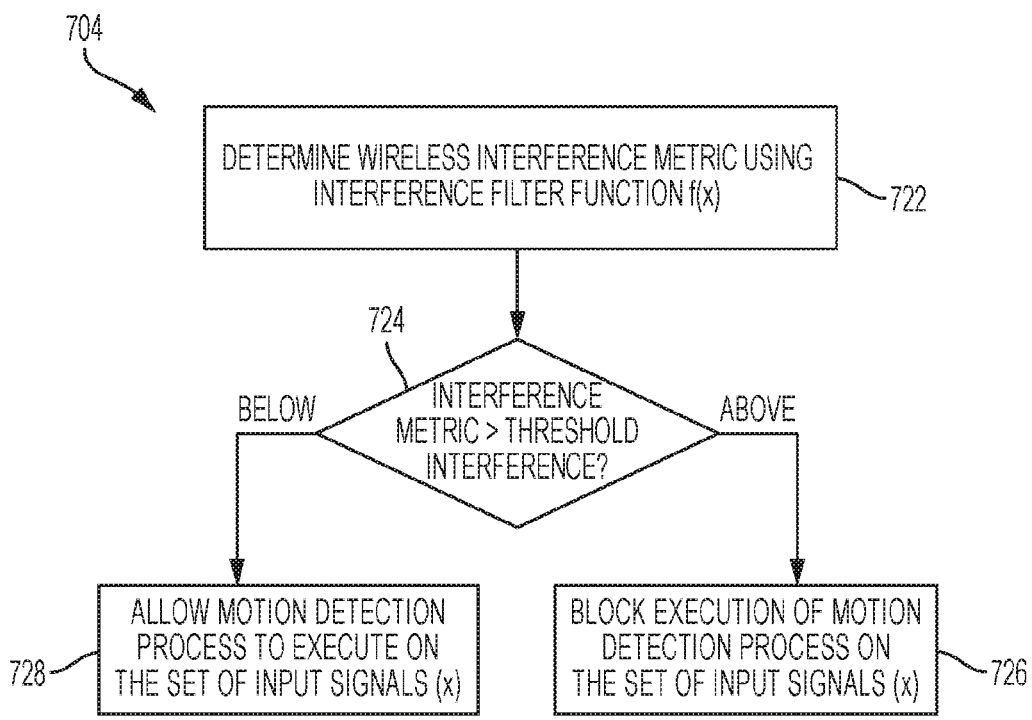

FIGS. 7A-7C are flow diagrams showing an example process 700 of time-aligning time motion detection signals. In some instances, the process 700 may be implemented to detect motion of an object in a space based on signals transmitted on a selected wireless communication channel. Operations in the example process 700 may be performed by a data processing apparatus (e.g., the processor 114 of the example wireless communication device 102C in FIG. 1) to detect motion based on signals received at wireless communication devices (e.g., wireless communication device 102C of FIG. 1). The example process 700 may be performed by another type of device. For instance, operations of the process 700 may be performed by a system other than the wireless communication device 102C that receives the signals (e.g., a computer system connected to the wireless communication system 100 of FIG. 1 that aggregates and analyzes signals received by the wireless communication device 102C).

The example process 700 may include additional or different operations, and the operations may be performed in the order shown or in another order. In some cases, one or more of the operations shown in FIGS. 7A-7C are implemented as processes that include multiple operations, sub-processes or other types of routines. In some cases, operations can be combined, performed in another order, performed in parallel, iterated, or otherwise repeated or performed another manner.

At 702, a set of N motion detection signals are obtained. The motion detection signals may include frequency-domain representations of wireless signals received at a wireless communication device, or channel responses associated with a space. The received wireless signals may be based on wireless signals transmitted through a space during a first time period. For example, referring to FIGS. 3A-3B, the motion detection signals obtained at 702 may be channel responses determined at one of wireless communication devices 304B, 304C based on the wireless signals transmitted through the space 300 by the wireless communication device 304A. The set of N motion detection signals may be obtained by loading the motion detection signals into an interference buffer (and motion detection buffer) in a first-in/first-out manner, as described above.

In some implementations, the set of N motion detection signals are quality-verified. For instance, in the example shown in FIG. 7B, the set of N motion detection signals are obtained at 702 by receiving an input signal (e.g., the motion detection signal 412), determining, at 708, a signal quality metric value (e.g., the value Q described above in Equation (9)) for the signal. At 710, the signal quality metric value is compared to a quality criterion (e.g., signal quality metric threshold value), and the motion detection signal is either rejected at 712 when the comparison result indicates that the Q value for the input signal fails to meet the quality criterion or accepted and loaded into both an interference buffer and motion detection buffer at 714.

At 704, an interference level in the set of motion detection signals obtained at 702 is determined. If the interference level is relatively low (e.g., indicating that any interference in the space is unlikely to affect the motion detection process), then a motion detection process is executed at 706 to detect motion of an object in the space based on subsets of the set of N motion detection signals. If the interference level is relatively high, then the first set of N motion detection signals are discarded or disregarded, and a second set of N motion detection signals are obtained at 702.

In some implementations, the level of interference may be determined using a wireless interference metric for the set of N motion detection signals. For instance, in the example shown in FIG. 7C, the determination of an interference level in motion detection signals obtained at 702 is made by determining, at 722, a wireless interference metric based on the set of N motion detection signals obtained at 702, and comparing, at 724, the determined wireless interference metric with the threshold interference value. The threshold interference value may be based on a magnitude of variation seen in interference signals that can affect (e.g., produce errors in) a motion detection process. At 722, a wireless interference metric is determined based on the set of N motion detection signals. For instance, referring to the example shown in FIG. 4, the interference filter 406 may analyze variations in the channel response over the set of N motion detection signals 416 stored in the interference buffer 402 by applying an interference filter function f(x) to the set of N motion detection signals 416. Considering that the interference filter function f(x) evaluates N motion detection signals, the wireless interference metric is determined after the interference buffer 402 has been loaded with a set of N motion detection signals.

At 724, the wireless interference metric is compared to a threshold interference value. If the wireless interference metric is at or above the threshold interference value, then a motion detection process is blocked from execution on the set of N motion detection signals at 726. If the wireless interference metric is below the threshold interference value, then the motion detection process executes on the set of N motion detection signals at 728. For example, referring to the example shown in FIG. 4, the interference filter 406 includes an interference gate having an output provided to the motion detection processor 408 that controls whether the motion detection processor 408 executes or is blocked (or otherwise prevented) from executing a motion detection process on the set of N motion detection signals. In some cases, the set of N motion detection signals are deleted from the interference buffer after the determination at 722.

At 706, a motion detection process is executed using a subset M of the N motion detection signals. In some instances, a new set of N motion detection signals are obtained over a second time period while the motion detection process executes on the subsets M of the N motion detection signals from the first time period (e.g., as described above with respect to FIGS. 5, 6). The second set of N motion detection signals may be obtained in the same manner as those at 702. In some cases, the motion detection buffer includes more than N data blocks, and obtaining the new set of N motion detection signals includes filling the motion detection buffer with the new set of N motion detection signals while storing a portion of the first set of N motion detection signals. Referring to the examples shown in FIGS. 5C and 5E for instance, motion is detected based on the M signals within the subset 506 of the motion detection buffer 504, while second set of motion detection signals {S(2N), S(2N−1), . . . , S(N+1)) is loaded into both the interference buffer 502 and motion detection buffer 504.

In some implementations, the motion detection process at 706 may compare information about the type of channel response variation (e.g., complex frequency components) of the subset of motion detection signals with information about previously-obtained channel responses to determine whether the type of channel response variation of the subset of motion detection signals indicates motion of an object in the space. For example, the motion detection process may analyze one or more statistical parameters of the channel response of the motion detection signals obtained at 702 (e.g., statistical parameters of frequency components of the channel response) to determine whether an object is moving in the space. In some implementations, the motion detection process at 706 may analyze statistical parameters of the received wireless signals themselves.

Some of the subject matter and operations described in this specification can be implemented in digital electronic circuitry, or in computer software, firmware, or hardware, including the structures disclosed in this specification and their structural equivalents, or in combinations of one or more of them. Some of the subject matter described in this specification can be implemented as one or more computer programs, i.e., one or more modules of computer program instructions, encoded on a computer-readable storage medium for execution by, or to control the operation of, data-processing apparatus. A computer-readable storage medium can be, or can be included in, a computer-readable storage device, a computer-readable storage substrate, a random or serial access memory array or device, or a combination of one or more of them. Moreover, while a computer-readable storage medium is not a propagated signal, a computer-readable storage medium can be a source or destination of computer program instructions encoded in an artificially generated propagated signal. The computer-readable storage medium can also be, or be included in, one or more separate physical components or media (e.g., multiple CDs, disks, or other storage devices). The computer-readable storage medium can include multiple computer-readable storage devices. The computer-readable storage devices may be co-located (instructions stored in a single storage device), or located in different locations (e.g., instructions stored in distributed locations).

Some of the operations described in this specification can be implemented as operations performed by a data processing apparatus on data stored in memory (e.g., on one or more computer-readable storage devices) or received from other sources. The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. In some instances, the data processing apparatus includes a set of processors. The set of processors may be co-located (e.g., multiple processors in the same computing device) or located in different location from one another (e.g., multiple processors in distributed computing devices). The memory storing the data executed by the data processing apparatus may be co-located with the data processing apparatus (e.g., a computing device executing instructions stored in memory of the same computing device), or located in a different location from the data processing apparatus (e.g., a client device executing instructions stored on a server device).

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read-only memory or a random-access memory or both. Elements of a computer can include a processor that performs actions in accordance with instructions, and one or more memory devices that store the instructions and data. A computer may also include, or be operatively coupled to receive data from or transfer data to, or both, one or more mass storage devices for storing data, e.g., non-magnetic drives (e.g., a solid-state drive), magnetic disks, magneto optical disks, or optical disks. However, a computer need not have such devices. Moreover, a computer can be embedded in another device, e.g., a phone, a tablet computer, an electronic appliance, a mobile audio or video player, a game console, a Global Positioning System (GPS) receiver, an Internet-of-Things (IoT) device, a machine-to-machine (M2M) sensor or actuator, or a portable storage device (e.g., a universal serial bus (USB) flash drive). Devices suitable for storing computer program instructions and data include all forms of non-volatile memory, media and memory devices, including by way of example semi-conductor memory devices (e.g., EPROM, EEPROM, flash memory devices, and others), magnetic disks (e.g., internal hard disks, removable disks, and others), magneto optical disks, and CD ROM and DVD-ROM disks. In some cases, the processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a stylus, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A computer system may include a single computing device, or multiple computers that operate in proximity or generally remote from each other and typically interact through a communication network. The communication network may include one or more of a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

In a general aspect of some of the examples described, motion detection signals are time-aligned using buffers.

In a first example, motion detection method is provided. The method includes loading a first set of input signals into an interference buffer over a first time period. The first set of input signals are based on a first set of wireless signals received by a wireless communication device after being wirelessly transmitted through a space. The method includes using the first set of input signals to determine a wireless interference metric. The method includes by operation of one or more processors, in response to a determination that the wireless interference metric is below a threshold level, executing a motion detection process in a second, subsequent time period over which a second set of input signals is loaded into the interference buffer. The motion detection process uses a subset of the first set of input signals to detect motion of an object in the space. The second set of input signals are based on second set of wireless signals received by the wireless communication device after being wireless transmitted through the space.

Implementations of the first example may, in some cases, include one or more of the following features. In the motion detection method, the motion detection process is repeatedly executed using multiple subsets of the first set of input signals to detect motion of an object in the space. In the motion detection method, loading the first set of input signals includes: comparing a signal quality metric for the wireless signals with a threshold; and rejecting wireless signals that have a signal quality metric above the threshold.

In a second example, the wireless interference metric includes a first wireless interference metric. The motion detection method further comprises: using the second set of input signals to determine a second wireless interference metric; and in response to a determination that the second wireless interference metric is above the threshold, blocking execution of the motion detection process on the second set of input signals.

Implementations of the second example may, in some cases includes one or more of the following features. The loading the first set of input signals includes filling the interference buffer. The motion detection method further includes: deleting the input signals from the interference buffer in response to the determination that the first wireless interference metric is below the threshold; and filling the interference buffer with the second set of input signals. The motion detection method further includes: filling a motion detection buffer with input signals from the first and second sets of input signals, wherein the motion detection process is executed on the input signals in a portion of the motion detection buffer. The interference buffer comprises N data blocks and the motion detection buffer comprises N+M−1 data blocks In some implementations, a computer-readable medium stores instructions that are operable when executed by a data processing apparatus to perform one or more operations of the first and second examples. In some implementations, a system (e.g., a wireless communication device, computer system, a combination thereof, or other type of system communicatively coupled to the wireless communication device) includes one or more data processing apparatuses and memory storing instructions that are operable when executed by the data processing apparatus to perform one or more operations of the first and second examples.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable sub combination.

A number of embodiments have been described. Nevertheless, it will be understood that various modifications can be made. Accordingly, other embodiments are within the scope of the following claims.

What is claimed is:

1. A motion detection method comprising:
    loading a first set of input signals into an interference buffer over a first time period, the first set of input signals based on a first set of wireless signals received by a wireless communication device after being wirelessly transmitted through a space;
    using the first set of input signals to determine a wireless interference level; and
    by operation of one or more processors, in response to a determination that the determined wireless interference level is below a threshold level, executing a motion detection process in a second, subsequent time period over which a second set of input signals is loaded into the interference buffer, wherein the motion detection process uses a subset of the first set of input signals to detect motion of an object in the space, and the second set of input signals are based on second set of wireless signals received by the wireless communication device after being wirelessly transmitted through the space.

2. The method of claim 1, wherein the motion detection process is repeatedly executed using multiple subsets of the first set of input signals to detect motion of an object in the space.

3. The method of claim 1, wherein the wireless interference level comprises a first wireless interference level, and the method comprises:
    using the second set of input signals to determine a second wireless interference level; and
    in response to a determination that the second wireless interference level is above the threshold level, blocking execution of the motion detection process on the second set of input signals.

4. The method of claim 3, wherein loading the first set of input signals comprises filling the interference buffer, and the method further comprises:
    deleting the input signals from the interference buffer in response to the determination that the first wireless interference level is below the threshold level; and
    filling the interference buffer with the second set of input signals.

5. The method of claim 4, further comprising:
    filling a motion detection buffer with input signals from the second set of input signals, wherein the motion detection process is executed on the input signals in a portion of the motion detection buffer.

6. The method of claim 5, wherein the interference buffer comprises N data blocks and the motion detection buffer comprises N+M−1 data blocks.

7. The method of claim 1, wherein loading the first set of input signals comprises:
    comparing a signal quality metric for the received first set of wireless signals with a threshold; and
    rejecting wireless signals that have a signal quality metric above the threshold.

8. A non-transitory computer-readable storage medium storing instructions that are operable when executed by the data processing apparatus to perform operations comprising:
    loading a first set of input signals into an interference buffer over a first time period, the first set of input signals based on a first set of wireless signals received by a wireless communication device after being wirelessly transmitted through a space;
    using the first set of input signals to determine a wireless interference level; and
    in response to a determination that the determined wireless interference level is below a threshold level, executing a motion detection process in a second, subsequent time period over which a second set of input signals is loaded into the interference buffer, wherein the motion detection process uses a subset of the first set of input signals to detect motion of an object in the space, and the second set of input signals are based on a second set of wireless signals received by the wireless communication device after being wirelessly transmitted through the space.

9. The non-transitory computer-readable storage medium of claim 8, wherein the motion detection process is repeatedly executed using multiple subsets of the first set of input signals to detect motion of an object in the space.

10. The non-transitory computer-readable storage medium of claim 8, wherein the wireless interference level comprises a first wireless interference level, and wherein the operations further comprise:
  using the second set of input signals to determine a second wireless interference level; and
  in response to a determination that the second wireless interference level is above the threshold level, blocking execution of the motion detection process on the second set of input signals.

11. The non-transitory computer-readable storage medium of claim 10, wherein loading the first set of input signals comprises filling the interference buffer, and wherein the operations further comprise:
  deleting the input signals from the interference buffer in response to the determination that the first wireless interference level is below the threshold level and filling the interference buffer with the second set of input signals.

12. The non-transitory computer-readable storage medium of claim 11, wherein the operations further comprise:
  filling a motion detection buffer with input signals from the second set of input signals, wherein the motion detection process is executed on the input signals in a portion of the motion detection buffer.

13. The non-transitory computer-readable storage medium of claim 12, wherein the interference buffer comprises N data blocks and the motion detection buffer comprises N+M−1 data blocks.

14. The non-transitory computer-readable storage medium of claim 8, wherein the operation of loading the first set of input signals comprises:
  comparing a signal quality metric for the received first set of wireless signals with a threshold; and
  rejecting wireless signals that have a signal quality metric above the threshold.

15. A motion detection system comprising:
  multiple wireless communication devices, each wireless communication device configured to detect motion of an object in the space based on a series of wireless signals received by the wireless communication device; and
  a data processor communicably coupled to the wireless communication devices and configured to:
    load a first set of input signals into an interference buffer over a first time period, the first set of input signals based on a first set of wireless signals received by a wireless communication device after being wirelessly transmitted through a space;
    use the first set of input signals to determine a wireless interference level; and
    in response to a determination that the determined wireless interference level is below a threshold level, execute a motion detection process in a second, subsequent time period over which a second set of input signals is loaded into the interference buffer, wherein the motion detection process uses a subset of the first set of input signals to detect motion of an object in the space, and the second set of input signals are based on second set of wireless signals received by the wireless communication device after being wirelessly transmitted through the space.

16. The system of claim 15, wherein the motion detection process is repeatedly executed using multiple subsets of the first set of input signals to detect motion of an object in the space.

17. The system of claim 15, wherein the wireless interference level comprises a first wireless interference level, and wherein the data processing apparatus is further configured to:
  use the second set of input signals to determine a second wireless interference level; and
  in response to a determination that the second wireless interference level is above the threshold level, block execution of the motion detection process on the second set of input signals.

18. The system of claim 17, wherein the data processing apparatus is further configured to:
  load the first set of input signals by filling the interference buffer;
  delete the input signals from the interference buffer in response to the determination that the first wireless interference level is below the threshold level; and
  fill the interference buffer with the second set of input signals.

19. The system of claim 18, wherein the data processing apparatus is further configured to:
  fill a motion detection buffer with input signals from the second set of input signals, wherein the motion detection process is executed on the input signals in a portion of the motion detection buffer.

20. The system of claim 19, wherein the interference buffer comprises N data blocks and the motion detection buffer comprises N+M−1 data blocks.

21. The system of claim 15, wherein the data processing apparatus is further configured to load the first set of input signals by:
  comparing a signal quality metric for the received first set of wireless signals with a threshold; and
  rejecting wireless signals that have a signal quality metric above the threshold.

* * * * *

UNITED STATES PATENT AND TRADEMARK OFFICE
CERTIFICATE OF CORRECTION

| | |
|---|---|
| PATENT NO. | : 9,933,517 B1 |
| APPLICATION NO. | : 15/803189 |
| DATED | : April 3, 2018 |
| INVENTOR(S) | : Christopher Vytautas Olekas and Dustin Griesdorf |

It is certified that error appears in the above-identified patent and that said Letters Patent is hereby corrected as shown below:

In Column 22, Line 3, Claim 1, after "on", insert -- a --.

In Column 24, Line 9, Claim 15, after "on", insert -- a --.

Signed and Sealed this
Twenty-ninth Day of May, 2018

Andrei Iancu
*Director of the United States Patent and Trademark Office*